(12) United States Patent
Tashiro

(10) Patent No.: US 7,449,863 B2
(45) Date of Patent: Nov. 11, 2008

(54) BATTERY PACK AND CHARGER WITH MEMORY HAVING OPERATING PERMISSION AND IMAGE DATA RECORDING MEANS

(75) Inventor: Kei Tashiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 10/839,053

(22) Filed: May 5, 2004

(65) Prior Publication Data

US 2005/0017679 A1     Jan. 27, 2005

(30) Foreign Application Priority Data

May 7, 2003   (JP)   ............... 2003-129087

(51) Int. Cl.
*H02J 7/00* (2006.01)
*H04N 5/232* (2006.01)
*G03B 7/26* (2006.01)
*G03B 17/32* (2006.01)

(52) U.S. Cl. ............... 320/112; 348/372; 396/277; 396/278; 396/539

(58) Field of Classification Search ............... 320/132, 320/107, 112; 348/372; 396/277–278, 297–300, 396/539
See application file for complete search history.

(56) References Cited

U.S. PATENT DOCUMENTS 5,248,929 A * 9/1993 Burke ............... 320/127
5,955,869 A * 9/1999 Rathmann ............... 320/132
6,005,367 A * 12/1999 Rohde ............... 320/106
6,008,620 A * 12/1999 Nagano et al. ............... 320/106
6,522,361 B2 * 2/2003 Higuchi et al. ............... 348/372
6,931,266 B2 * 8/2005 Miyoshi et al. ............... 455/572

FOREIGN PATENT DOCUMENTS

| JP | 11 233157 | 8/1999 |
| JP | 2001 78068 | 3/2001 |
| JP | 2001-134493 | * 5/2001 |

* cited by examiner

*Primary Examiner*—Akim Enayet Ullah
*Assistant Examiner*—Richard V Muralidar
(74) *Attorney, Agent, or Firm*—Frommer Lawrence & Haug LLP; William S. Frommer; Thomas F. Presson

(57) ABSTRACT

A battery pack that includes a data storage unit capable of storing data processed with an electronic device and a data control unit for controlling reading, writing, deleting, and duplicating of data in the data storing unit. A data communication unit for transmitting and receiving data controlled by the data control unit. A charger includes a data communication unit for transmitting and receiving data with the battery pack via a communication terminal and a data operating unit for sending control signals instructing data reading, writing, deleting, and duplicating of data in the data storage unit of the battery pack via the data communication unit. A data reproducing unit for reproducing the data obtained via the data communication unit. This provides a simple battery pack which can record data handled by an electronic device to which the battery pack is mounted, and a charger enabling easy operating of the recorded data.

7 Claims, 21 Drawing Sheets

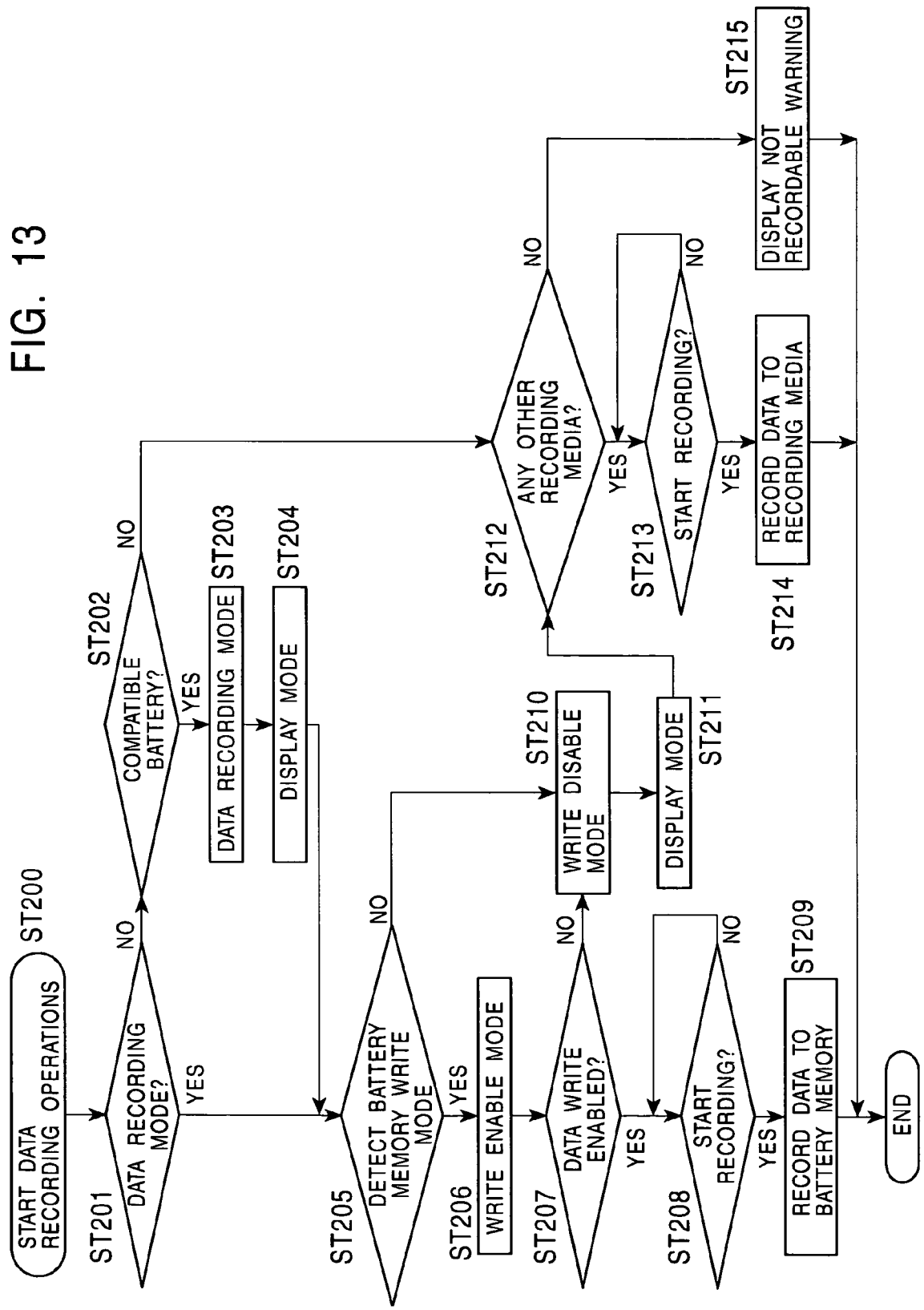

BATTERY PACK AND CHARGER WITH MEMORY HAVING OPERATING PERMISSION AND IMAGE DATA RECORDING MEANS

BACKGROUND OF THE INVENTION

1. Field of the Invention

The present invention relates to a battery pack and a charger. More specifically, the present invention relates to a battery pack which can record data handled by electronic equipment to which it is mounted, and a charger which can operate the data recorded in the battery pack.

2. Description of the Related Art

Conventionally, electronic devices such as digital video cameras, portable information devices, and so forth, receive electric power supply necessary for operating from repeatedly-rechargeable batteries (hereafter referred to as a "battery pack") with a charger so as to enable outdoor use or use away from the home or office. Data recorded by such an electronic device (e.g., image data taken with a digital video camera) is recorded in a memory card or on a recording medium (magnetic tape, disk, or the like) mounted to a recording device which the electronic device has.

As an arrangement for reducing the size of the main unit of the electronic device, a video camera has been proposed wherein a memory card can be inserted to the battery pack, with data being recorded in the memory card mounted on the battery pack (Japanese Unexamined Patent Application Publication No. 2001-78068, p4 and FIG. 1).

However, with a battery pack in which the memory card can be inserted and removed as described above, a memory card insertion/ejection mechanism need to be provided to the battery pack itself, so the configuration is complicated, and accordingly costs more than conventional battery packs. Also, the battery pack and memory card are separate articles, meaning that there may be cases wherein the user forgets to take a memory card, or losses, damages, or ruins the memory card. In short, in addition to costs, this arrangement has problems with regard to handling.

Also, this arrangement is troublesome since data recorded in the memory card mounted on the battery pack can only be read, rewritten, erased (deleted), or the like, by setting the memory card in the battery pack and mounting the battery pack to which the memory card has been set to the electronic device main unit, or removing the memory card from the battery pack and setting the memory card in a separate device capable of reading/writing of the data. That is, playing or displaying of data is troublesome.

SUMMARY OF THE INVENTION

Accordingly, it is an object of the present invention to provide a battery pack with a simple structure which is capable of recording data handed by the electronic device to which the battery pack is mounted.

It is a further object of the present invention to realize easy operation of the data recorded in the battery pack.

To achieve these objects, according to a first aspect of the present invention, a battery pack comprises: a connection terminal connecting to electronic equipment so as to supply electric power thereto, and also connect to a charger so as to be charged thereby; a communication terminal for performing data communication with the electronic equipment and the charger with which connection is made; storage means for storing data processed by the electronic equipment; data control means for controlling reading processing, writing processing, deleting processing, and duplication processing of the data with regard to the data storage means, based on control signals from the electronic equipment or the charger; and data communication means for transmission and reception of the data via the communication terminal under control of the data control means; wherein the storage means, the data control means, and the data communication means are built within the battery pack.

The data storage means may store information relating to electric power capacity of the battery pack, as well as data processed by the electronic equipment. Also, the data communication means may transmit information relating to the electric power capacity of the battery pack via the communication terminal.

According to a second aspect of the present invention, a charger, for charging a battery pack with data storage means for storing data processed by electronic equipment, comprises: a connection terminal for connecting to and charging the battery pack; a communication terminal for connecting to and communicating with the battery pack; data communication means for transmitting and receiving the data to and from the battery pack via the communication terminal; operating means for transmitting control signals for instructing reading processing, writing processing, deleting processing, and duplication processing of the data with regard to the data storage means of the battery pack, via the data communication means; and data reproducing means for reproducing the data obtained via the data communication means.

According to a third aspect of the present invention, a charger, for charging a battery pack with data storage means for storing data processed by electronic equipment, comprises: a connection terminal for connecting to and charging the battery pack; a communication terminal for connecting to and communicating with the battery pack; data communication means for transmitting and receiving the data to and from the battery pack via the communication terminal; operating means for transmitting control signals for instructing reading processing, writing processing, deleting processing, and duplication processing of the data with regard to the data storage means of the battery pack, via the data communication means; and data output means for outputting the data obtained via the data communication means.

According to a fourth aspect of the present invention, a charger, for charging a battery pack with data storage means for storing data processed by electronic equipment, comprises: a connection terminal for connecting to and charging the battery pack; a first communication terminal for connecting to and communicating with the battery pack; a second communication terminal for connecting to and communicating with an information processing device capable of controlling reading processing, writing processing, deleting processing, and duplication processing of the data with regard to the data storage means of the battery pack; first data communication means for transmitting and receiving the data to and from the battery pack via the first communication terminal; second data communication means for transmitting and receiving the data via the second communication terminal; and data operating control means for controlling transmission and reception of the data between the battery pack and the information processing device via the first and second communication means.

As described above, the battery pack has built-in data storage means, data control means, and data communication means, so mounting the battery pack on the electronic device or charger enables data communication with the electronic device or charger using the data communication means, and the data control means control reading processing, writing processing, deleting processing, and duplicating processing, of the data with regard to the data storage means, based on control signals from the electronic device or charger. Accordingly, data can be operated with the battery pack mounted on the electronic device or charger.

On the other hand, the charger performs data communication with the battery pack by the data communication means, and the data operating means transmit control signals instructing reading processing, writing processing, deleting processing, and duplicating processing, of the data with regard to the data storage means of the battery pack, via the data communication means. Thus, the data in the data storage means of the battery pack can be operated, and data obtained via the data communication means can be reproduced with data reproducing means or output by the data output means and reproduced on another device.

Also, the charger comprises a first communication terminal for connecting to and communicating with the battery pack, first data communication means, a second communication terminal for connecting to and communicating with an information processing device capable of controlling reading processing, writing processing, deleting processing, and duplication processing of the data with regard to the data storage means of the battery pack, second data communication means, and data operating control means for controlling transmission and reception of the data between the battery pack and the information processing device via the first and second communication means, so that the data can be operated from the information processing device connected to the charger with regard to the data storage means of the battery pack.

Thus, the data processed with an electronic device is recorded in memory in the battery pack, so mounting or detaching recording media (memory cards, magnetic tape, etc.) is unnecessary, and the data recorded in the memory of the battery pack can be operated with the battery pack remaining set in the electronic device or a charger. Accordingly, the present invention is highly advantageous in that data can be easily operated.

Also, the memory for recording the data processed by the electronic device is built into the battery pack, so the structure of the battery pack is simple and the same connection terminals and communication terminals as with conventional battery packs can be used. Accordingly, the present invention is advantageous in enabling application to electronic devices using conventional battery packs.

On the other hand, the charger comprises data operating means whereby data recorded in the memory of the battery pack can be operated, data reproducing means for reproducing the data, data output means enabling output of the data to other devices, and/or data operating means whereby an information processing device such as a PC can be connected so as to operate the data. Accordingly, the present invention is highly advantageous in that data reading processing, writing processing, deleting processing, duplication processing, and so forth, and be easily carried out while charging the battery pack.

Moreover, the terminals of the electronic devices to be connected to battery packs and the terminals of chargers can be of the same configuration as conventional ones, and the electronic device does not need a structure for mounting recording media (memory cards, magnetic tape, etc.) for recording data, leading to reduction in size of the device and improving easy of carrying. This is further advantageous in doing away with the chance of the user forgetting or loosing recording media.

BRIEF DESCRIPTION OF THE DRAWINGS

FIG. 13 is a flowchart illustrating the flow of operations occurring at the time of the data (image data) processed at the electronic device (image-taking device) being recorded in the memory of the battery pack, with the configuration shown in FIG. 3;

DESCRIPTION OF THE PREFERRED EMBODIMENTS

Next, embodiments of the battery pack and charger according to the present invention will be described with reference to the drawings. Not that the drawings have been provided for illustrative purposes, and do not restrict the technical scope of the present invention in any way.

Figure 1:
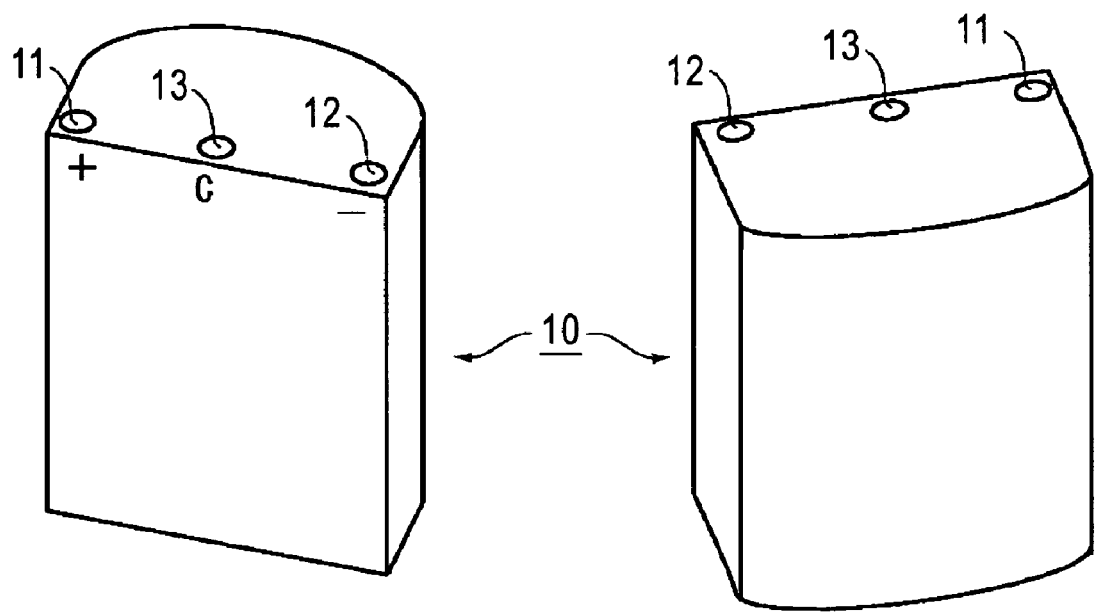
FIG. 1 is an external view illustrating an example of a battery pack according to the present invention.

FIG. 1 illustrates an external view of a battery pack 10, comprising a positive terminal 11 and a negative terminal 12 for connecting to an electronic device and supplying electric power thereto, or for connecting to a charger (not shown) so as to be charged, and a communication terminal 13 for data communication with the electronic device.

Figure 2:
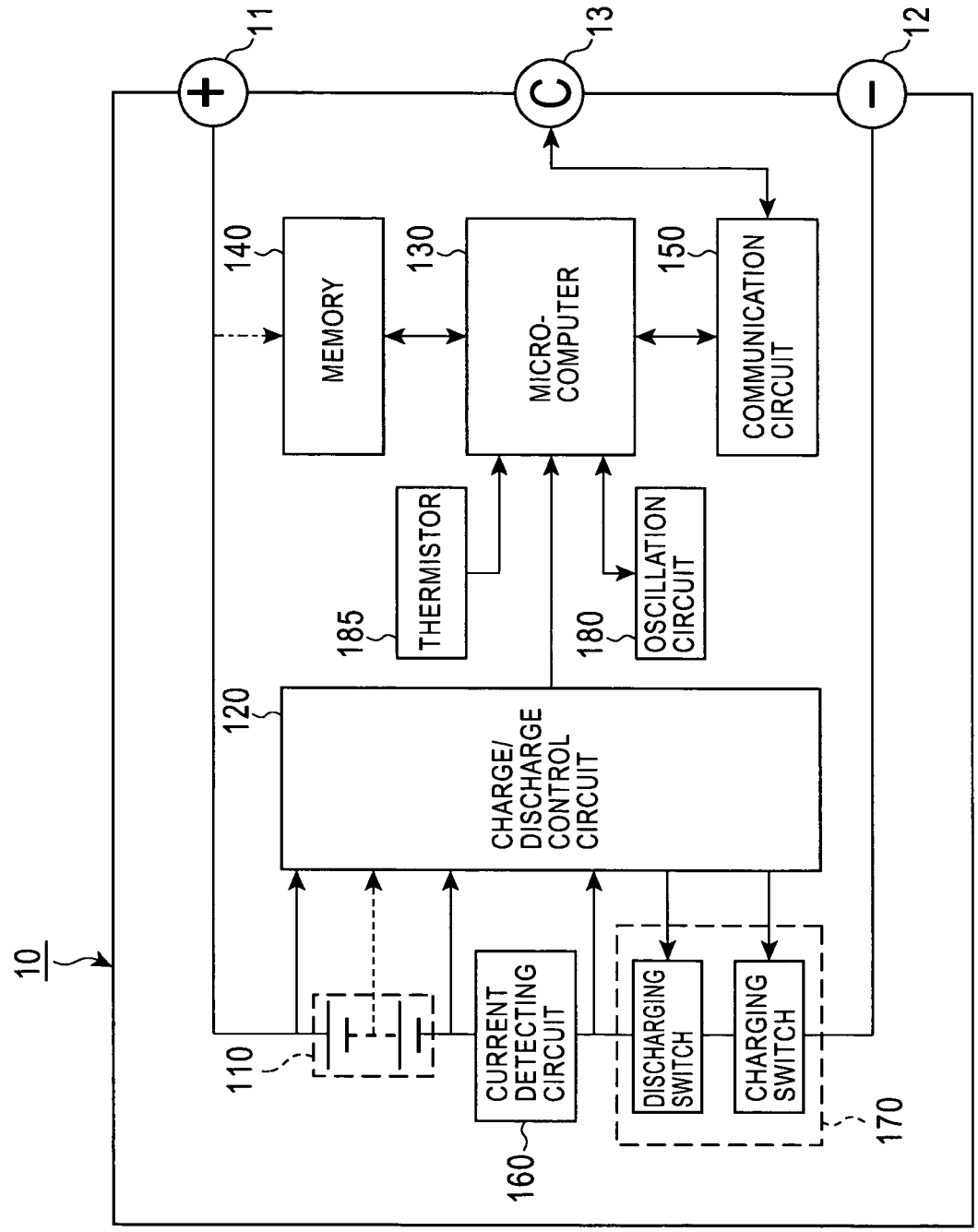
FIG. 2 is a block diagram schematically illustrating the internal configuration of the battery pack according to the present invention.

FIG. 2 is a block diagram illustrating the internal configuration of the battery pack 10 shown in FIG. 1 in a simplified manner, the battery back 10 comprising a battery cell 110, a charge/discharge control circuit 120, micro-computer 130, memory 140, communication circuit 150, current detecting circuit 160, charge/discharge control switch 170, oscillating circuit 180, thermistor 185, and so forth.

The battery cell 110 is charged by the charger via the positive terminal 11 and the negative terminal 12, and supplies electric power to the electronic device to which the battery pack 10 is mounted, and to the components within the battery pack 10 following the setting of the charge-discharge control switch 170.

The charge/discharge control circuit 120 controls the charge/discharge control switch 170, and also collects information relating to the current value which the current detecting circuit 160 detects and the electric power capacity of the battery cell 110 and so forth (hereafter referred to as "battery cell information"), and sends this information to the micro-computer 130.

The micro-computer 130 operates based on timing signals from the oscillating circuit 180, and performs control of read/write operations of data from and to the memory 140, and control of the communication circuit 150, based on control programs, operating control signals from the electronic device which are transmitted via the communication circuit 150, and so forth.

The memory 140 follows the control of the micro-computer 130 to store data exchanged with the electronic device by writing the data in a storage area, read the stored data out from the storage area, and erase (delete) the data therefrom.

Also, flag information indicating that the battery pack is capable of recording data (hereafter referred to as "battery type information") is stored in a predetermined memory area of the memory 140, and the electronic device and charger detect this battery type information so as to discriminate whether or not the battery pack is "data-recording-compatible".

Also, the memory 140 can be set to one of two modes: one is a "write enable mode" wherein writing of data to the storage area is permitted, and the other is a "write disable mode" wherein writing of data to the storage area is forbidden. Further, flag information can be set to a predetermined memory area for indicating which operation of data writing, rewriting, and erasing (deleting) is to be permitted (hereafter referred to as "operation permission information"), thereby controlling data rewriting.

This operation permission information can be set by software from the electronic device, and an arrangement may be made wherein the battery pack is provided with a switch so that the operation permission information is set by switching this switch.

Also, the memory 140 is configured so as to be capable of reading/writing battery cell information as well as the battery type information and operation permission information, thereby sharing necessary memory area within the battery pack. Moreover, the memory 140 is configured so as to be capable of receiving electric power supply from the battery cell 10, which enables memory with a great storage capacity to be built in.

The communication circuit 150 performs data communication with the electronic device via the communication terminal 13 under control of the micro-computer 130, so as to send data and battery cell information stored in the memory 140 to the electronic device or charger, and transfer data sent from the electronic device or charger to the micro-computer 130.

Note that the configuration wherein the communication terminal 13 which sends and receives data also serves as the communication terminal used for sending battery cell information with conventional battery packs enables the battery pack according to the present embodiment to be used with electronic devices which use conventional battery packs.

The current detecting circuit 160 detects the current value applied to the battery cell 110, and sends the detected current value to the charge/discharge control circuit 120.

The charge/discharge control switch 170 switches between charging and discharging of the battery cell 110 with a charging switch and a discharging switch, under control of the charge/discharge control circuit 120.

The oscillating circuit 180 generates timing signals upon which the processing and control operations at the battery pack are based, and supplies the timing signals to the micro-computer 130.

The thermistor 185 detects the temperature within the battery pack, and sends the detected internal temperature data to the micro-computer 130.

Figure 3:
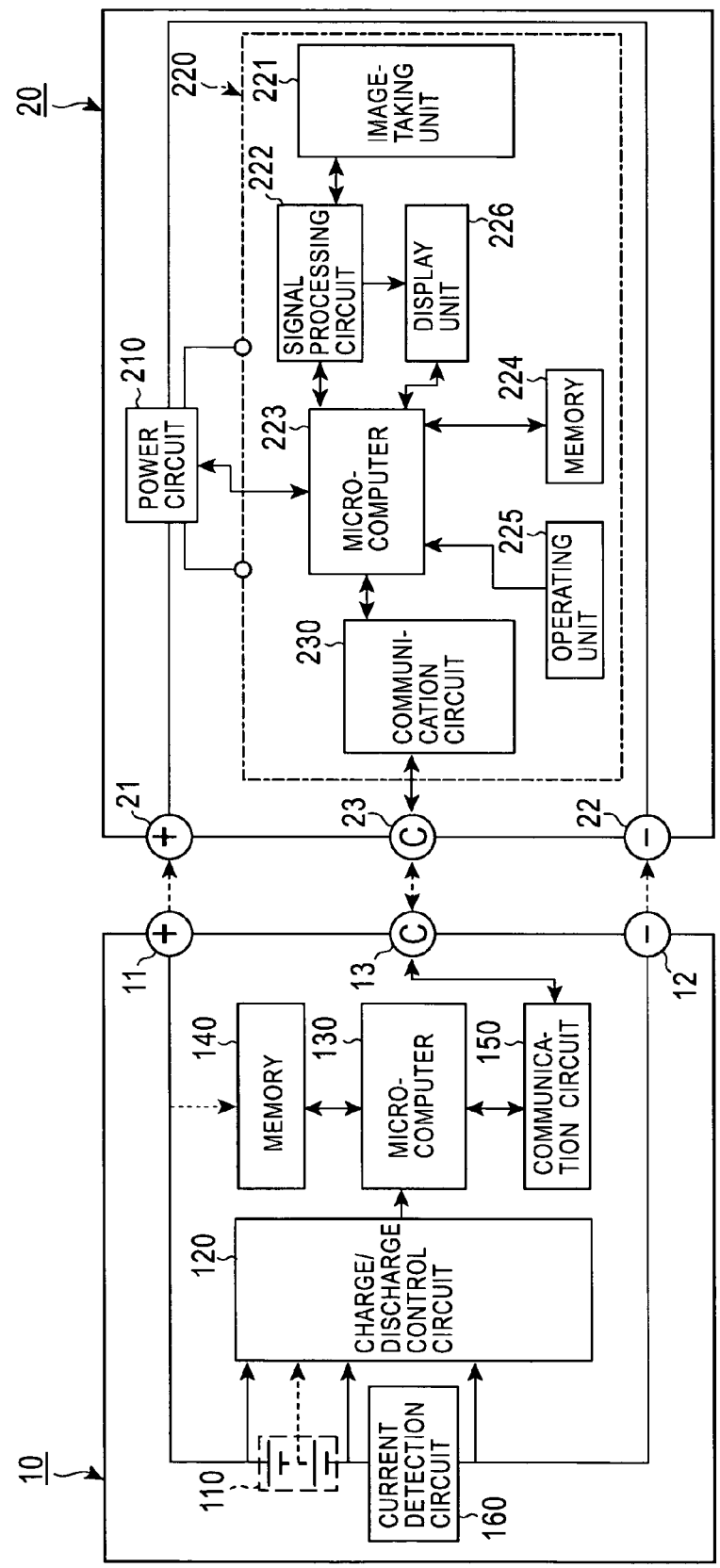
FIG. 3 is a block diagram schematically illustrating configuration of the battery pack shown in FIG. 2 when mounted on an image-taking device which is an electronic device.

Next, the configuration of the battery pack 10 shown in FIG. 1 connected to the electronic device will be described. FIG. 3 is a block diagram illustrating the configuration of the battery pack 10 connected to an image-taking device 20 (electronic device) in a simplified manner, as one example. Note that description of the battery pack 10 will be omitted here, since the configuration is the same as that shown in FIG. 2. Moreover, the charge/discharge control switch 170, oscillating circuit 180, and thermistor 185 are omitted from the description.

The image-taking device 20, which is an electronic device, comprises an electric power source circuit 210, and a main circuit 220 which runs on electric power supplied from the electric power source circuit 210. The main circuit 220 is configured of an image-taking unit 221, signal processing unit 222, micro-computer 223, memory 224, operating unit 225, display unit 226, communication circuit 230, and so forth.

The electric power source circuit 210 supplies electric power, obtained from an electric power source such as the battery pack 10 or the like, to the main circuit 220, via the positive terminal 21 and negative terminal 22.

The image-taking unit 221 of the main circuit 220 takes in light from a subject being imaged, converts the light into picture signals, and sends the picture signals to the signal processing unit 222, under the control of the micro-computer 223.

The signal processing unit 222 of the main circuit 220 subjects the picture signals sent from the image-taking unit 221 to predetermined signal processing such as correction processing (white balance, gradation, brightness, color, and other such correction processing) and so forth, and sends the picture signals which have been subjected to such signal processing to the display unit 226 or the like, under control of the micro-computer 223.

The micro-computer 223 of the main circuit 220 controls the components of the main circuit based on control programs or on operation information from the user, which is sent via the operating unit 225.

Also, the micro-computer 223 obtains battery type information recorded in the memory 140 of the battery pack 10 via the communication circuit 230, to discriminate whether or not the battery pack 10 is "data-recording compatible", and obtaining the mode information and write enable information set in the memory 140 of the battery pack 10, so as to discriminate the state of the memory 140.

The memory 224 of the main circuit 220 stores or saves setting information set via the operating unit 225, setting information obtained via the communication circuit 230, battery cell information, and the like, in the storage area, and reads out the data stored in the storage area and sends this to the micro-computer 223, under control of the micro-computer 223.

The operating unit 225 of the main circuit 220 sends operating instructions such as instructions for actions of the device, to the micro-computer 223.

The display unit 226 of the main circuit 220 displays picture signals from the signal processing unit 222 and data from the micro-computer 223 on a liquid crystal screen or an EVF (Electronic ViewFinder) or the like, under control of the micro-computer 223.

The communication circuit 230 of the main circuit 220 operates under control of the micro-computer 223 to perform data communication processing with the battery pack 10 via the communication terminal 23, send setting information stored in the memory 224 and picture signals (and audio signals) taken with the image-taking unit 221 to the battery pack 10, and receive data and battery cell information and the like sent from the battery pack 10 so as to be transferred to the micro-computer 223.

Figure 4:
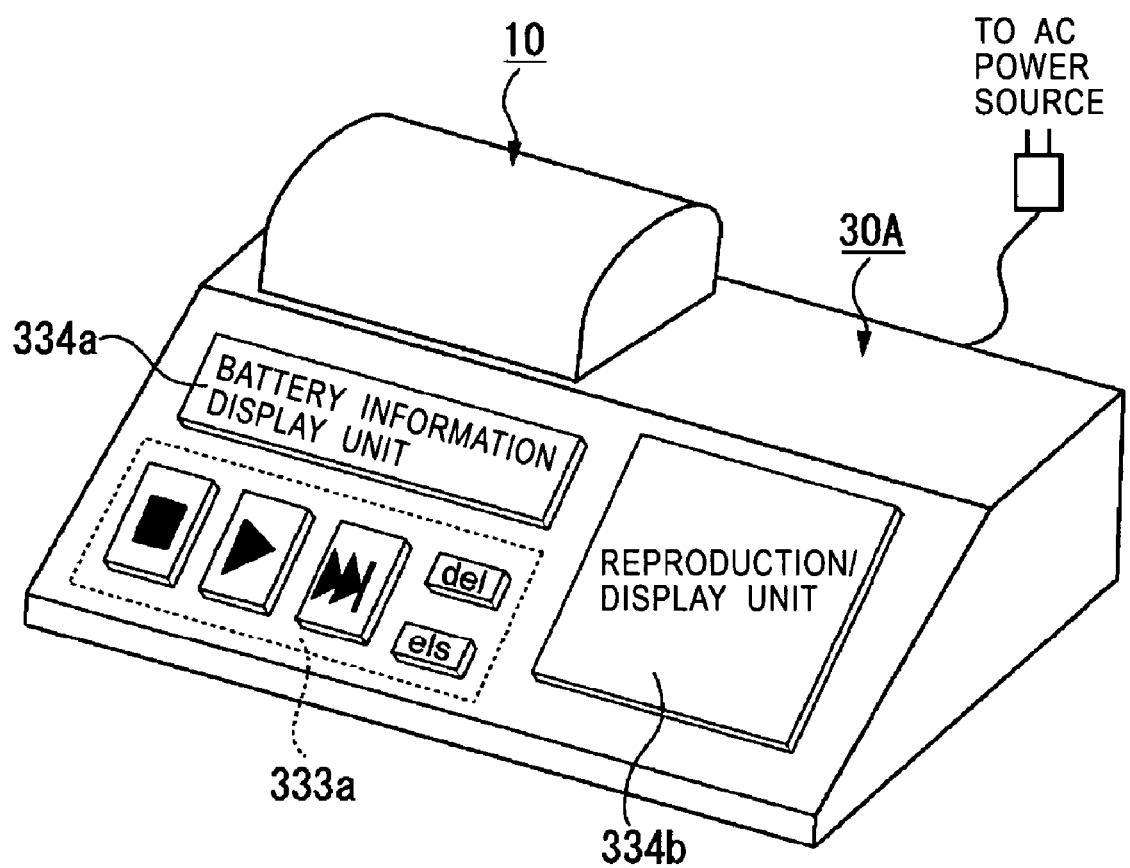
FIG. 4 is an external view illustrating an example of the battery pack set in the charger according to the present invention.

Next, the charger for charging the above battery pack 10 shown in FIG. 2 will be described. FIG. 4 is an external view of the battery pack 10 connected to the charger 30A. The charger 30A comprises a memory operating unit 333a for operating data stored in the memory 140 of the battery pack 10, a battery information displaying unit 334a for displaying information relating to the battery pack 10 (battery cell information and so forth), and a data reproduction/display unit 334b for reproducing and displaying data stored in the memory 140 of the battery pack 10.

Figure 5:
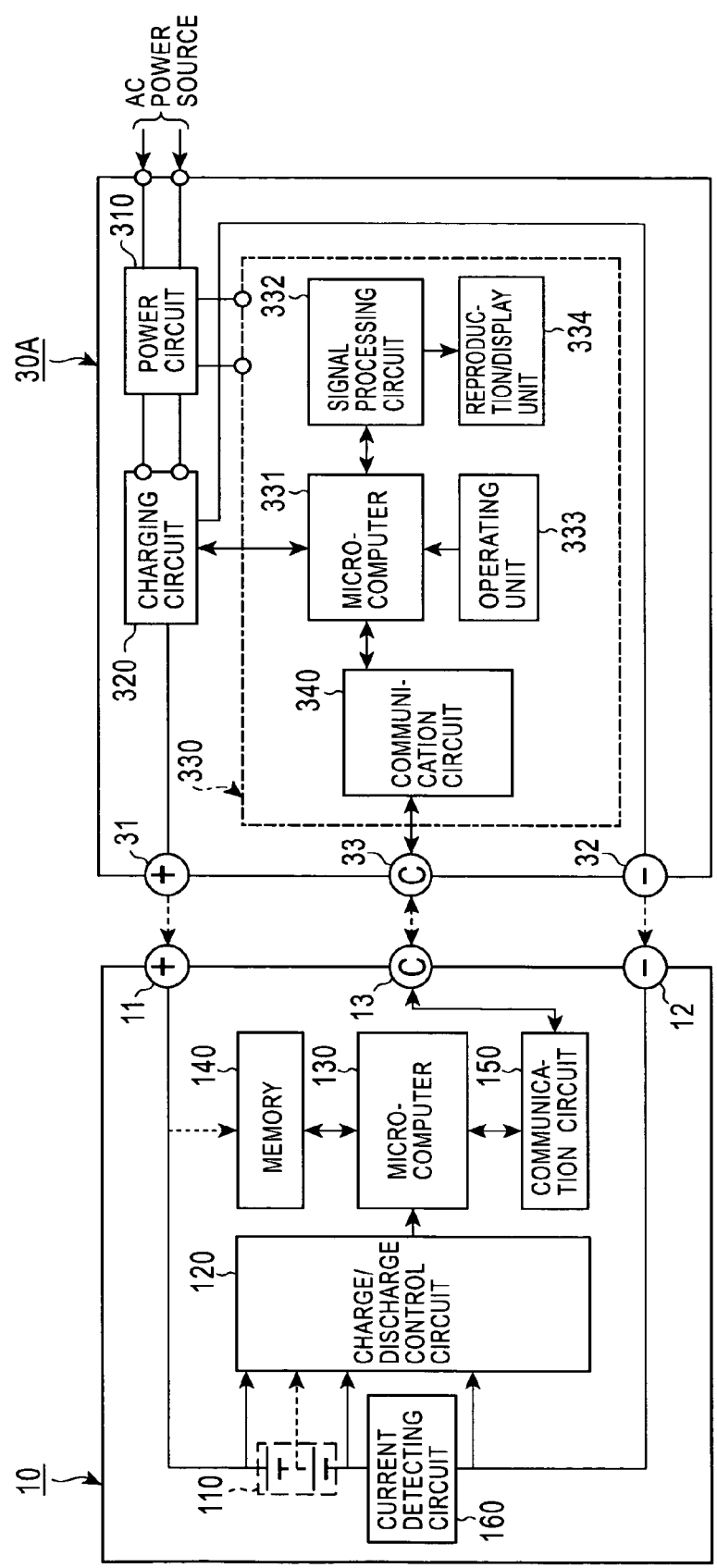
FIG. 5 is a block diagram schematically illustrating the internal configuration of the charger and battery pack illustrated in FIG. 4.

FIG. 5 is a block diagram illustrating the internal configuration of the battery pack 10 and charger 30A shown in FIG. 4, in a simplified manner. The battery pack 10 is illustrated with the charge/discharge control switch 170, oscillating circuit 180, and thermistor 185 omitted, and further, other configurations are the same as those shown in FIG. 2 and accordingly description thereof will be omitted.

The charger 30A comprises an electric power source circuit 310, charging circuit 320, and main circuit 330. The main circuit 330 is configured of a micro-computer 331, signal processing circuit 332, operating unit 333, reproduction/display unit 334, and a communication circuit 340.

The electric power source circuit 310 converts electric power obtained from an AC power source and supplies this to the charging circuit 320 and the main circuit 330. The charging circuit 320 charges the battery pack 10 with the electric power supplied from the electric power source circuit 310, via the positive terminal 31 and negative terminal 32, under control of the micro-computer 331.

The micro-computer 331 of the main circuit 330 controls the charging circuit 320 and the main circuit components based on control programs and operating information from the user which is sent via the operating unit 333.

Based on the operating information sent from the operating unit 333, the micro-computer 331 sends operating control signals to the communication circuit 340 for executing operations such as reading, writing, rewriting, erasing (deleting), etc., of the data in the memory 140 of the battery pack 10, and also sends the data from the battery pack 10 received at the communication circuit 340 to the signal processing circuit 332.

The signal processing circuit 332 of the main circuit 330 processes the data of the battery pack 10 sent from the micro-computer 331 and sends this to the reproduction/display unit 334, under control of the micro-computer 331.

The operating unit 333 of the main circuit 330 sends to the micro-computer 331 operation information based on operations of the memory operating unit 333a, that is, operation information for instructing reading, writing, rewriting, erasing (deleting), etc., of the data in the memory 140 of the battery pack 10.

The reproduction/display unit 334 of the main circuit 330 reproduces and/or displays the data of the battery pack 10 that has been processed by the signal processing circuit 332 on the battery information display unit 334a or data reproduction/display unit 334b. The communication circuit 340 of the main circuit 330 performs communication with the battery pack 10 via the communication terminal 33 under the control of the micro-computer 331.

Figure 6:
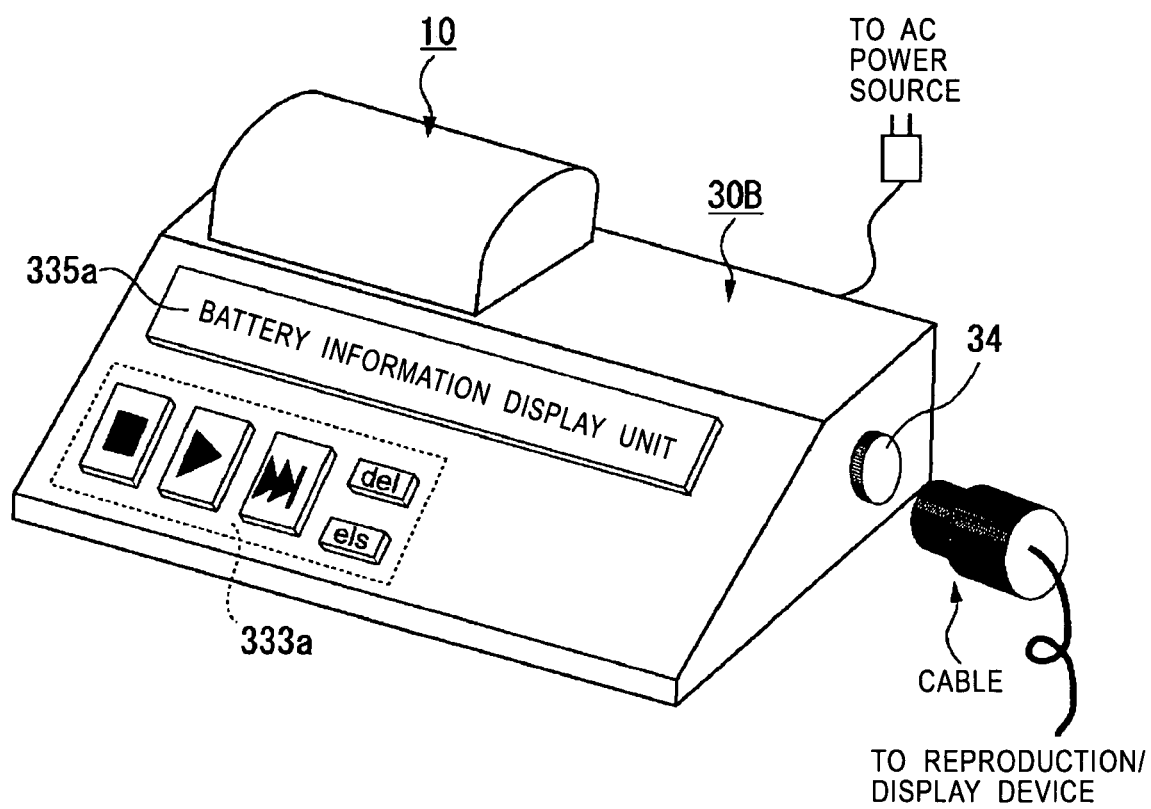
FIG. 6 is an external diagram of the battery pack set in a charger which has different configuration from that shown in FIG. 4.

Next, a charger 30B with a different configuration will be described. FIG. 6 is an external view of the battery pack 10 connected to the charger 30B. The charger 30B comprises a memory operating unit 333a for operating data stored in the memory 140 of the battery pack 10, a battery information displaying unit 335a for displaying information relating to the battery pack 10 (battery cell information and so forth), and an output terminal 34 for outputting data in the memory 140 of the battery pack 10.

Figure 7:
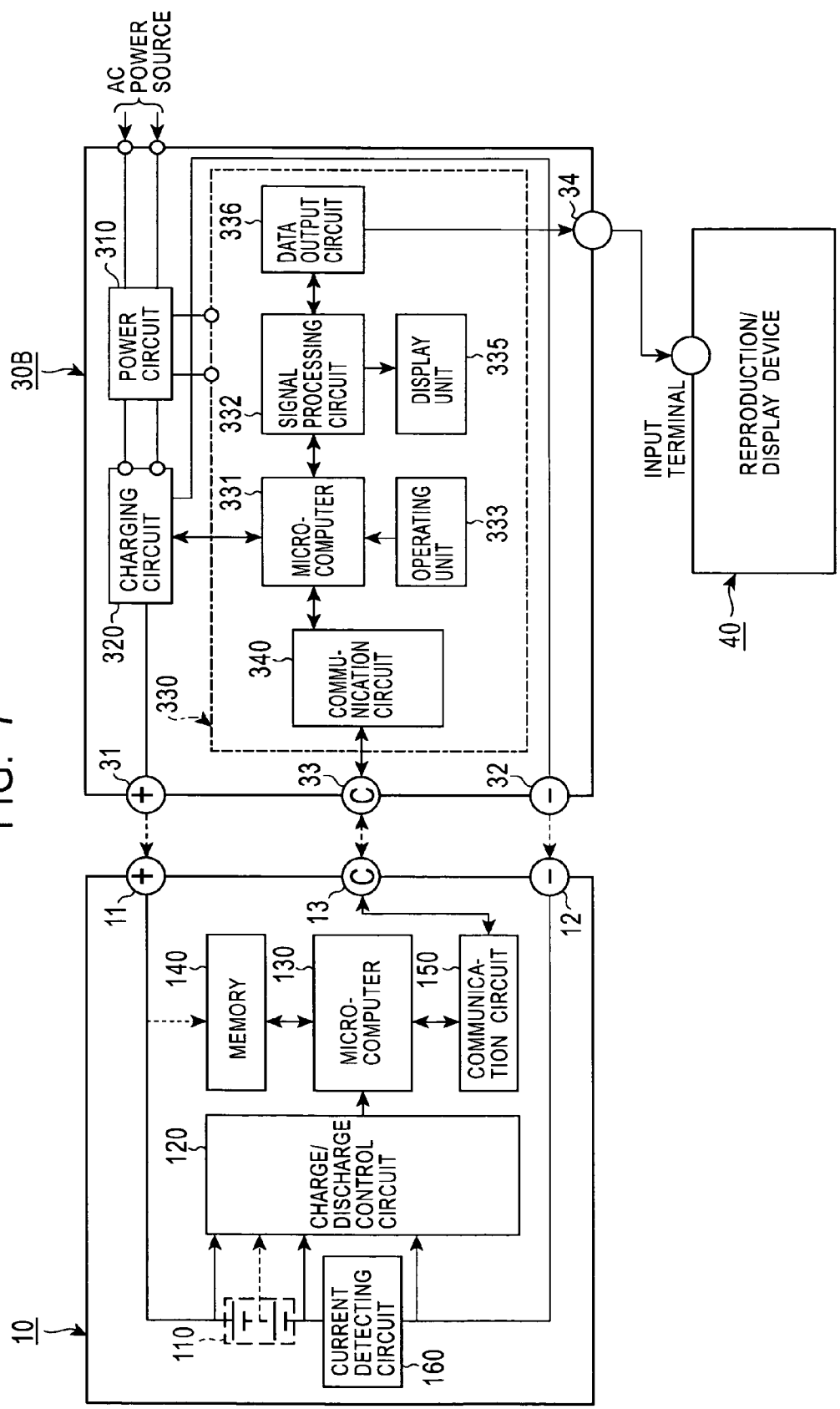
FIG. 7 is a block diagram schematically illustrating the internal configuration of the charger and battery pack illustrated in FIG. 6.

FIG. 7 is a block diagram illustrating the internal configuration of the battery pack 10 and charger 30B shown in FIG. 6, in a simplified manner, when connected to a reproduction/display device 40. The battery pack 10 is illustrated with the charge/discharge control switch 170, oscillating circuit 180, and thermistor 185 omitted, and further, other configurations are the same as those shown in FIG. 2 and accordingly description thereof will be omitted.

The charger 30B comprises an electric power source circuit 310, charging circuit 320, and main circuit 330. The main circuit 330 is configured of a micro-computer 331, signal processing circuit 332, operating unit 333, display unit 335, data output circuit 336, and a communication circuit 340.

The electric power source circuit 310 converts electric power obtained from an AC power source and supplies this to the charging circuit 320 and the main circuit 330. The charging circuit 320 charges the battery pack 10 with the electric power supplied from the electric power source circuit 310, via the positive terminal 31 and negative terminal 32, under control of the micro-computer 331.

The micro-computer 331 of the main circuit 330 controls the charging circuit 320 and the main circuit components based on control programs and operating information from the user which is sent via the operating unit 333.

Based on the operating information sent from the operating unit 333, the micro-computer 331 sends operating control signals to the communication circuit 340 for executing operations such as reading, writing, rewriting, erasing (deleting), etc., of the data in the memory 140 of the battery pack 100, and also sends the data from the battery pack 10 received at the communication circuit 340 to the signal processing circuit 332.

The signal processing circuit 332 of the main circuit 330 processes the data of the battery pack 10 sent from the micro-computer 331 and sends this to the data output unit 336, under control of the micro-computer 331. Also, of the data sent from the micro-computer 331, information relating to the battery pack 10 (battery cell information, etc.) is sent to the display unit 335.

The operating unit 333 of the main circuit 330 sends to the micro-computer 331 operation information based on operations of the memory operating unit 333a, that is, operation information for instructing reading, writing, rewriting, erasing (deleting), etc., of the data in the memory 140 of the battery pack 10.

The display unit 335 of the main circuit 330 displays the information regarding the battery pack 10 (battery cell information, etc.) sent from the signal processing circuit 332, on the battery information display unit 335a.

The data output unit 336 of the main circuit 330 converts the data sent from the signal processing circuit 332 into a predetermined data format by processing, and sends this to the reproduction/display device 40 connected via the output terminal 34.

Now, the reproduction/display device 40 comprises an input terminal for connection with the output terminal 34 of the charger 30B, and is a device which is capable of reproducing or displaying data (for example, picture signals, audio signals, and the like) sent via the output terminal 34 of the charger 30B. The communication circuit 340 of the main circuit 330 performs data communication with the battery pack 10 via the communication terminal 33, under control of the micro-computer 331.

Figure 8:
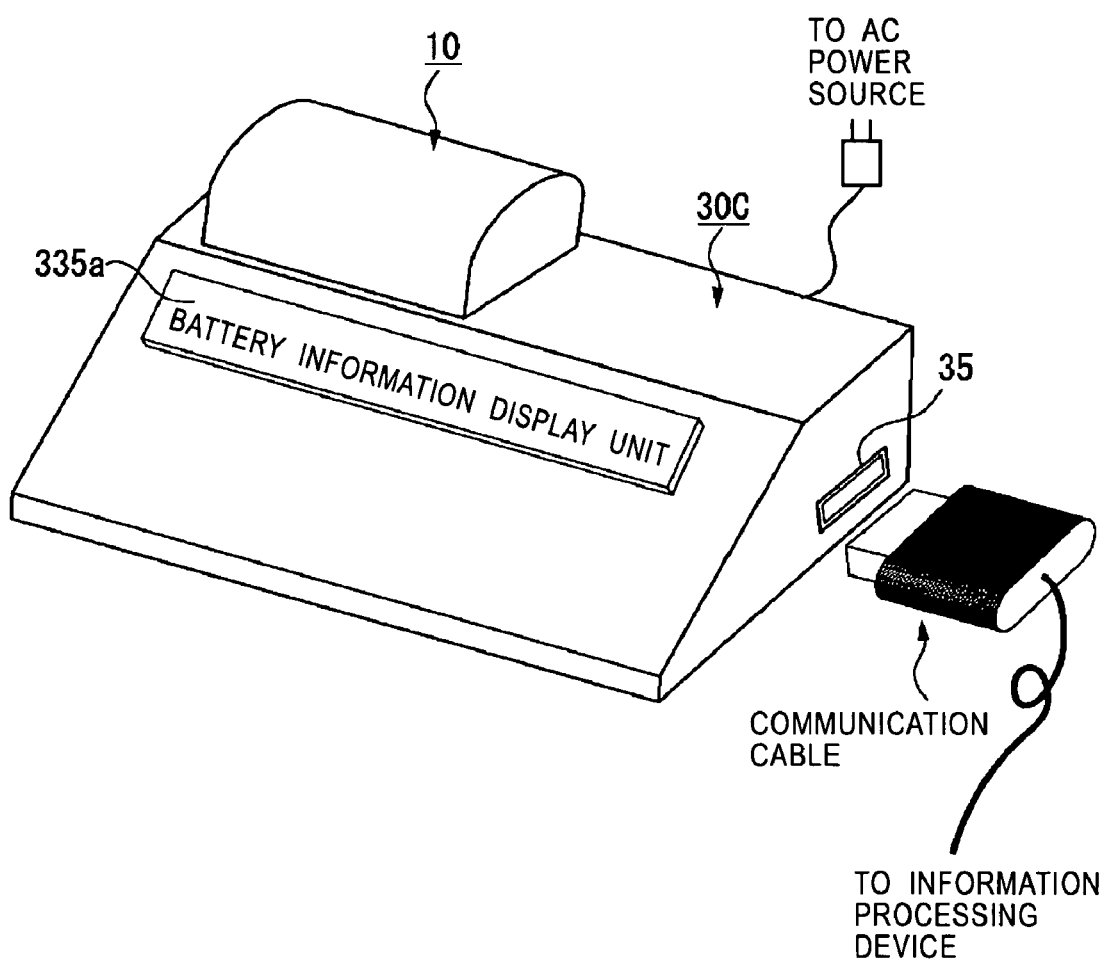
FIG. 8 is an external diagram of the battery pack set in a charger which has different configuration from that shown in FIGS. 4 and 6.

Next, a charger 30C with yet another configuration will be described. FIG. 8 is an external view of the battery pack 10 connected to the charger 30C. The charger 30C comprises a battery information displaying unit 335a for displaying information relating to the battery pack 10 (battery cell information and so forth), and an external communication terminal 35 for outputting data in the memory 140 of the battery pack 10 by connecting with an information processing device 50 capable of operating the data.

Figure 9:
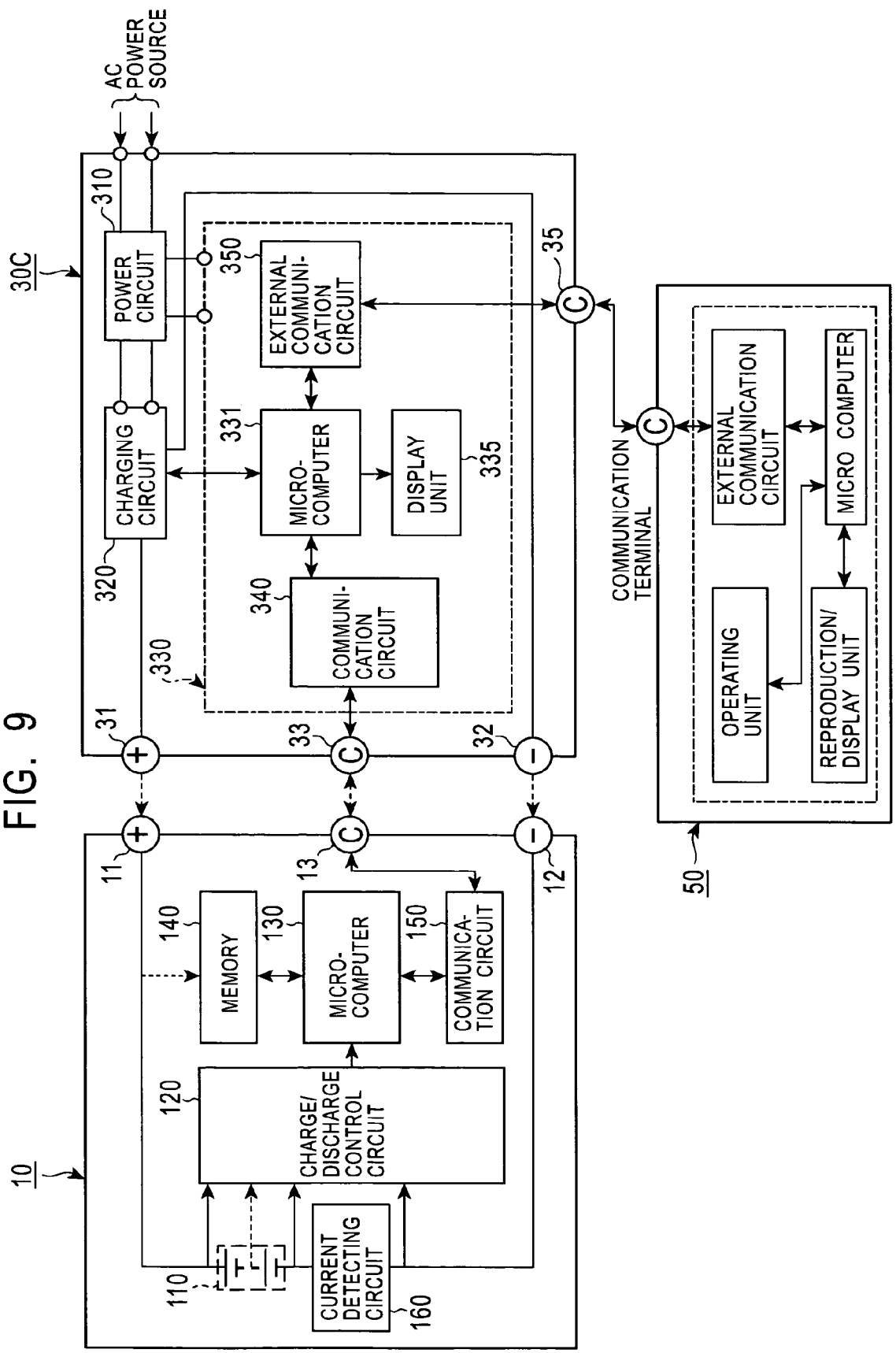
FIG. 9 is a block diagram schematically illustrating the internal configuration of the charger and battery pack illustrated in FIG. 8.

FIG. 9 is a block diagram illustrating the internal configuration of the battery pack 10 and charger 30C shown in FIG. 8, in a simplified manner, when connected to the information processing device 50. The battery pack 10 is illustrated with the charge/discharge control switch 170, oscillating circuit 180, and thermistor 185 omitted, and further, other configurations are the same as those shown in FIG. 2 and accordingly description thereof will be omitted.

The charger 30C comprises an electric power source circuit 310, charging circuit 320, and main circuit 330. The main circuit 330 is configured of a micro-computer 331, display unit 335, communication circuit 340, and an external communication circuit 350.

The electric power source circuit 310 converts electric power obtained from an AC power source and supplies this to the charging circuit 320 and the main circuit 330. The charging circuit 320 charges the battery pack 10 with the electric power supplied from the electric power source circuit 310, via the positive terminal 31 and negative terminal 32, under control of the micro-computer 331.

The micro-computer 331 of the main circuit 330 controls the charging circuit 320 and the main circuit components based on control programs and operating information from the information processing device 50 which is sent via the external communication circuit 350.

Based on the operating information from the information processing device 50 received with the external communication circuit 350, the micro-computer 331 sends operating control signals to the communication circuit 340 for executing operations such as reading, writing, rewriting, erasing (deleting), etc., of the data in the memory 140 of the battery pack 10, and also sends the data of the battery pack 10 received with the communication circuit 340 to the external communication circuit 350.

Of the information received with the communication circuit 340, the information regarding the battery pack 10 (battery cell information, etc.) is sent to the display unit 335. The display unit 335 of the main circuit 330 displays the information regarding the battery pack 10 (battery cell information, etc.) sent from the micro-computer 331 on the battery information display unit 335a. The communication circuit 340 of the main circuit 330 performs data communication with the battery pack 10 via the communication terminal 33, under control of the micro-computer 331.

The external communication circuit 350 of the main circuit 330 receives operating information and the like from the information processing device 50 which is sent via the external communication terminal 35 and transfers this to the micro-computer 331, and also sends the data of the battery pack 10 sent from the micro-computer 331 to the information processing device 50 and the like.

The information processing device 50 is, for example, a personal computer (hereafter referred to simply as "PC") or a like electronic device, and is configured of a micro-computer, operating unit, communication terminal and external communication circuit for connecting to the external communication terminal 35 of the charger 30C, and so forth. The information processing device 50 connects to the external communication terminal 35 of the charger 30C for communication of data with the charger 30C, and sends operating signals regarding the memory 140 of the battery pack 10 (data writing, reading, erasing (deleting), and so forth) to the charger 30C, and also is capable of reproducing or displaying data of the battery pack 10 obtained by control of the charger 30C, and also capable of output to other devices.

Next, the process of actions for storing data processed with the electronic device to which the battery pack described above is mounted in the memory of the battery pack, and reproducing or displaying the data stored in the battery by setting in the charger, will be described.

Figure 10:
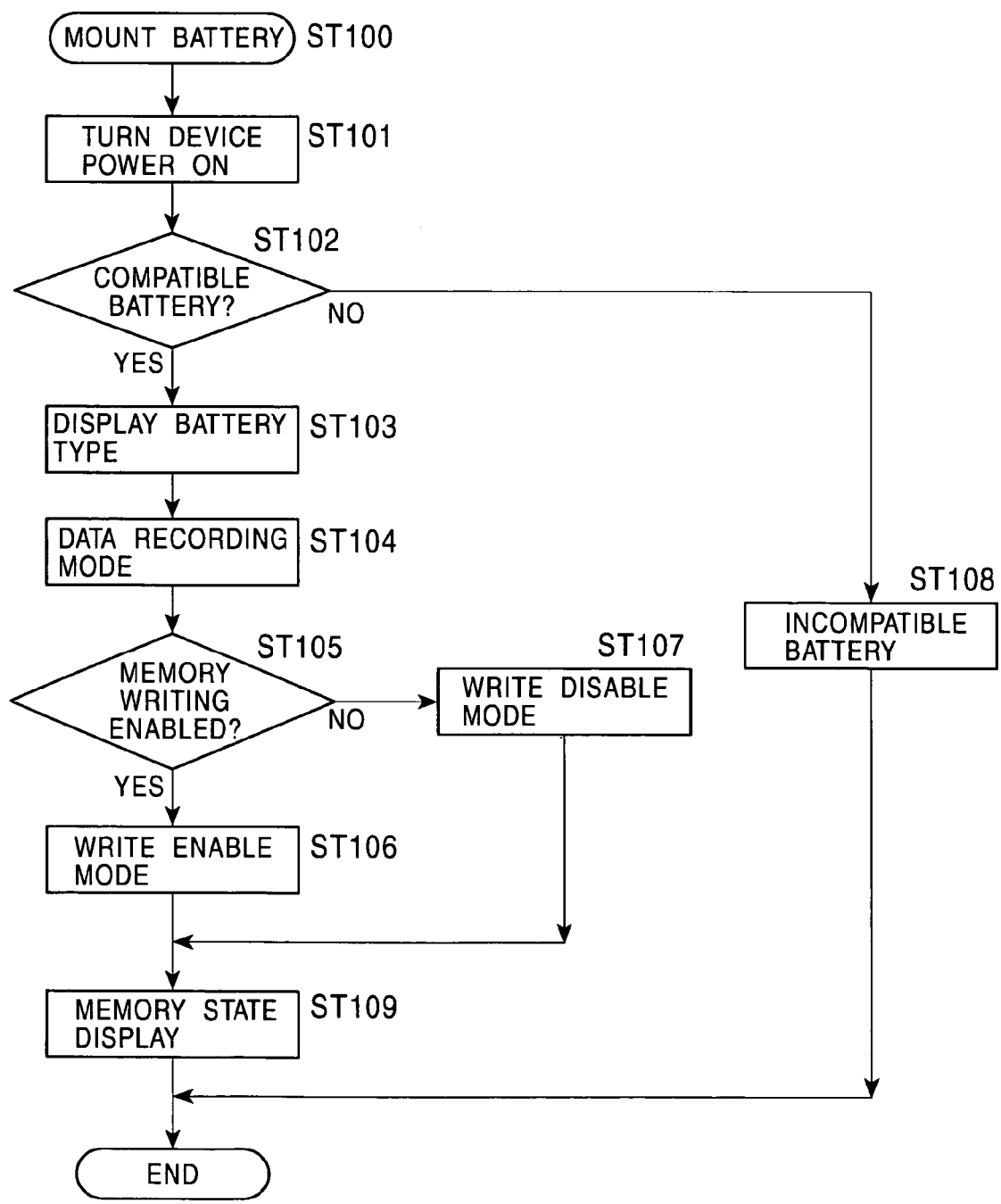
FIG. 10 is a flowchart illustrating the flow of operations occurring upon the battery pack being mounted to an electronic device (image-taking device), with the configuration shown in FIG. 3.
Figure 11:
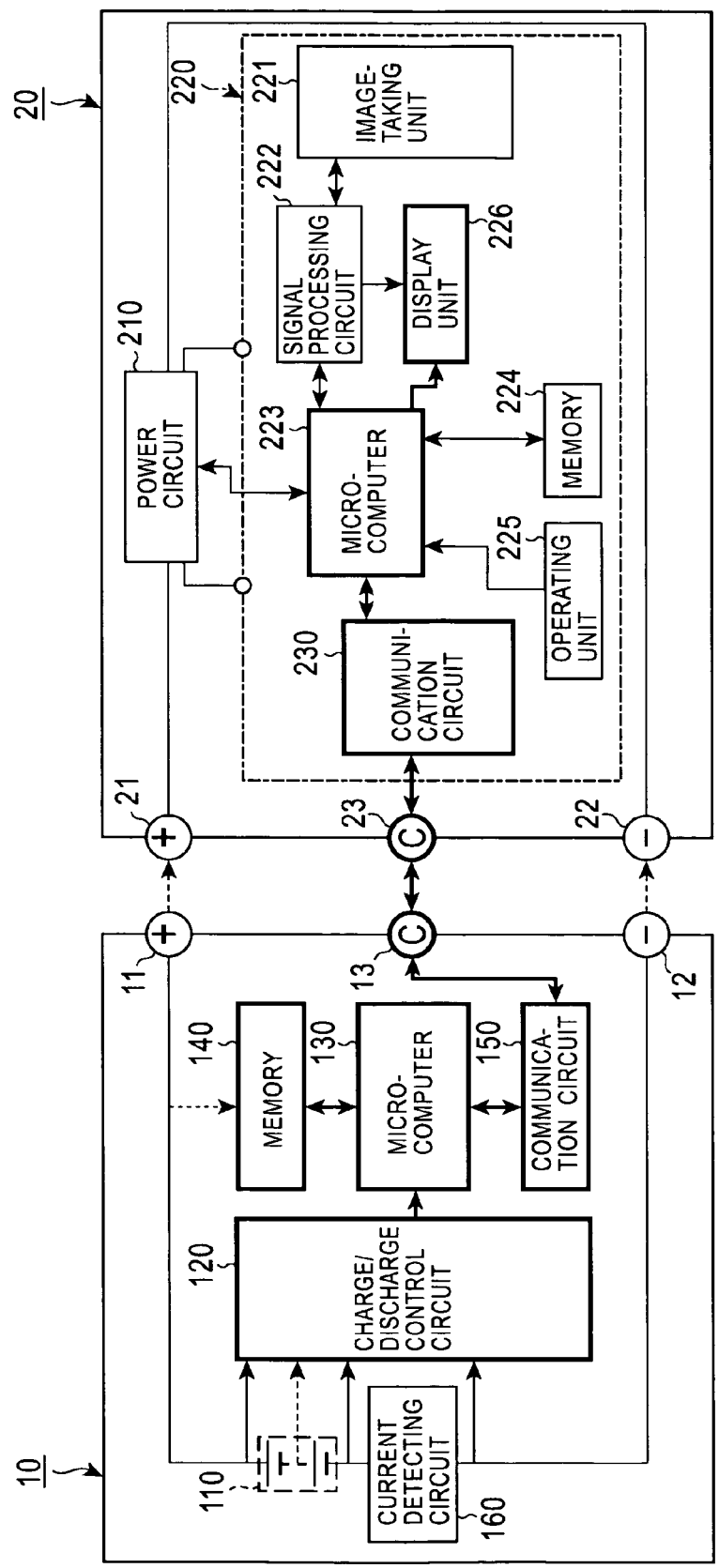
FIG. 11 is an explanatory diagram illustrating the data communication path between the electronic device shown in FIG. 10 and the battery pack.

First, the actions carried out at the time of detecting the type of battery pack and the settings of the memory built into the battery pack at the time of mounting the battery pack 10 to the image-taking device 20 (electronic device) will be described with reference to the flowchart shown in FIG. 10. The blocks and lines which are drawn heavier than the others in FIG. 11 indicate the data communication path for this case.

Upon mounting the battery pack 10 to the image-taking device 20, the positive terminal 11, negative terminal 12, and communication terminal 13 of the battery pack 10 are connected with the positive terminal 21, negative terminal 22, and communication terminal 23 of the image-taking device 20, and the electric power stored in the battery pack 10 is supplied to the electronic device 20 (ST100).

Turning the electric power source of the image-taking device 20 on starts data communication between the communication circuit 150 of the battery pack 10 and the communication circuit 230 of the image-taking device 20, via the communication terminal 13 and communication terminal 23. Upon data communication starting with the image-taking device 20, the micro-computer 130 of the battery pack 10 reads out the battery type information set in the memory 140 (ST101). Further, the micro-computer 130 of the battery pack 10 sends the battery type information and the battery cell information collected with the charge/discharge control circuit 120 to the image-taking device 20. The battery cell information is sent out via the communication terminal 13 by the communication circuit 150, in the same way as with the battery type information.

The micro-computer 223 of the image-taking device 20 receives the battery type information and battery cell information sent from the battery pack 10, and discriminates whether or not the battery pack is a "data-recording compatible" type, based on the battery type information (ST102).

In the event that the battery type information is not "data-recording compatible", the micro-computer 223 of the image-taking device 20 displays on the display unit 226 the battery capacity and amount of time remaining for operation, based on the battery cell information, as with conventional battery packs (ST102→ST108→end).

Figure 12A:
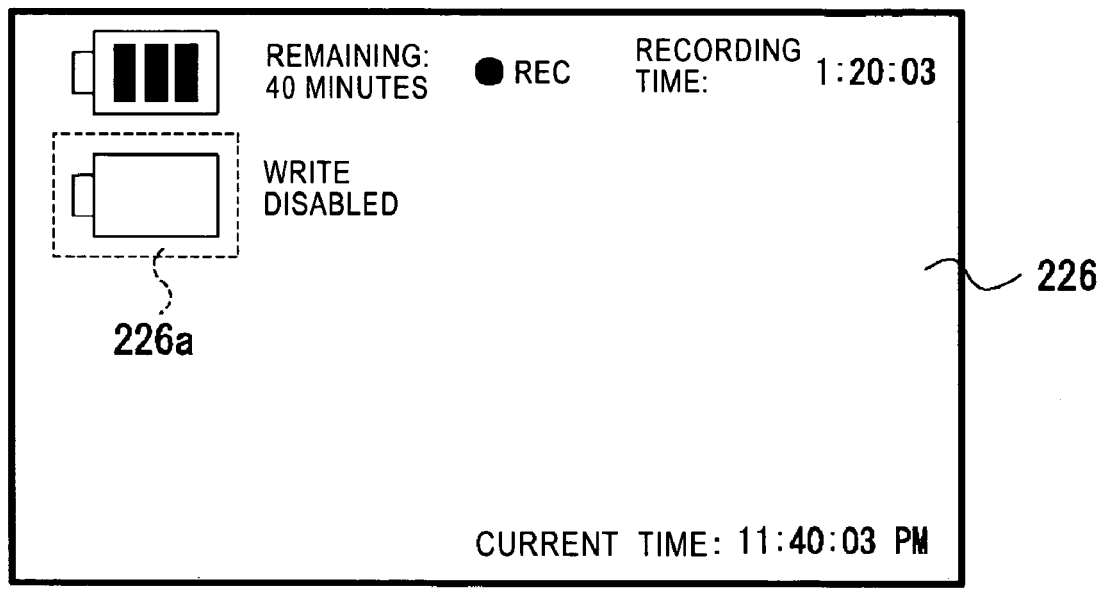
FIG. 12 is an explanatory diagram illustrating an example of the display unit of the electronic device (image-taking device) in FIG. 10.
Figure 12B:
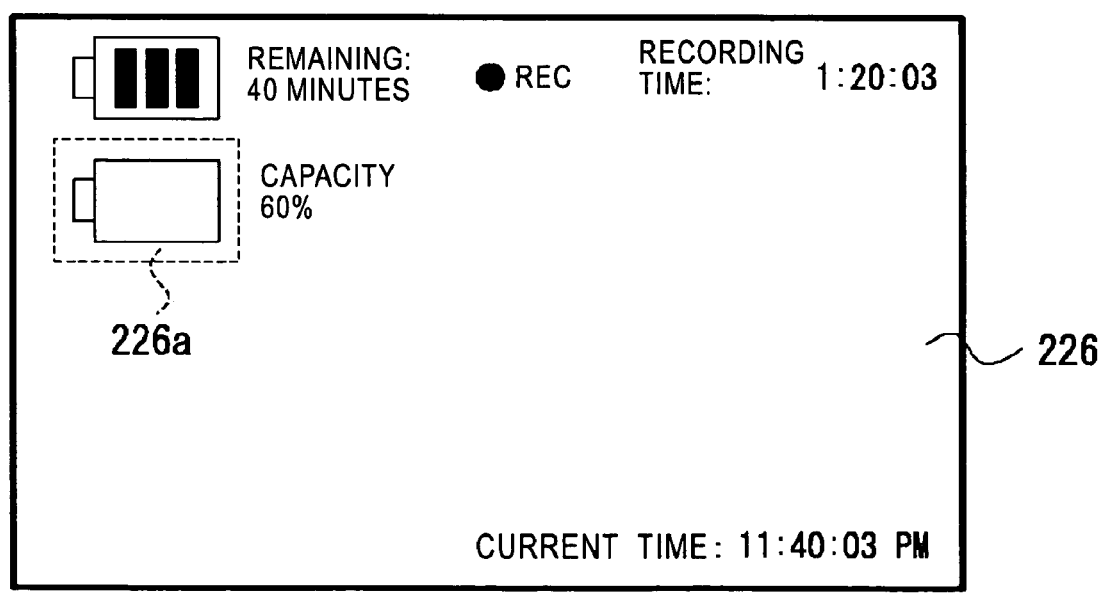

In the event that the battery type information is "data-recording compatible", the micro-computer 223 of the image-taking device 20 displays on the display unit 226 an icon 226a indicating that the battery type information is "data-recording compatible", along with the battery remaining time, recording time, current time, etc, as shown in FIG. 12B, for example (ST103).

Upon sending the battery type information and battery cell information to the image-taking device 20, the battery pack 10 enters a "data recording mode" for recording data form the image-taking device 20, and also sends mode information which indicates the write mode state set in the memory 140 to the image-taking device 20 (ST104).

Upon receiving the mode information sent from the battery pack 10, the micro-computer 223 of the image-taking device 20 performs detection of the write mode set in the memory 140 of the battery pack 10, based on this mode information (ST105).

In the event that the micro-computer 223 of the image-taking device 20 detects that the memory 140 of the battery pack 10 is set to the "write disable mode", a display is made o the display unit 226 to the effect that the mode is "write disabled", as shown in FIG. 12A (ST105→ST107→ST109).

In the event that the micro-computer 223 of the image-taking device 20 detects that the memory 140 of the battery pack 10 is set to the "write enable mode", the micro-computer 223 then sends a signal requesting the storage capacity information (available capacity or used capacity) of the memory 140 of the battery pack 10 (ST105→ST106).

Upon receiving the send request signal for the storage capacity information sent from the image-taking device 20, the micro-computer 130 of the battery pack 10 generates storage capacity information for the memory 140 (available capacity or used capacity) and sends this to the image-taking device 20 (ST106).

The micro-computer 223 of the image-taking device 20 receives the storage capacity information of the memory 140 (available capacity or used capacity) sent from the battery pack 10, and displays the received storage capacity information (available capacity or used capacity) on the display unit 226 (EVF or liquid crystal screen) as shown in FIG. 12B (ST106→ST109).

Next, the actions of writing (recording) the data processed at the electronic device to the memory of the battery pack mounted on the electronic device will be described with reference to the flowchart shown in FIG. 13.

Figure 14:
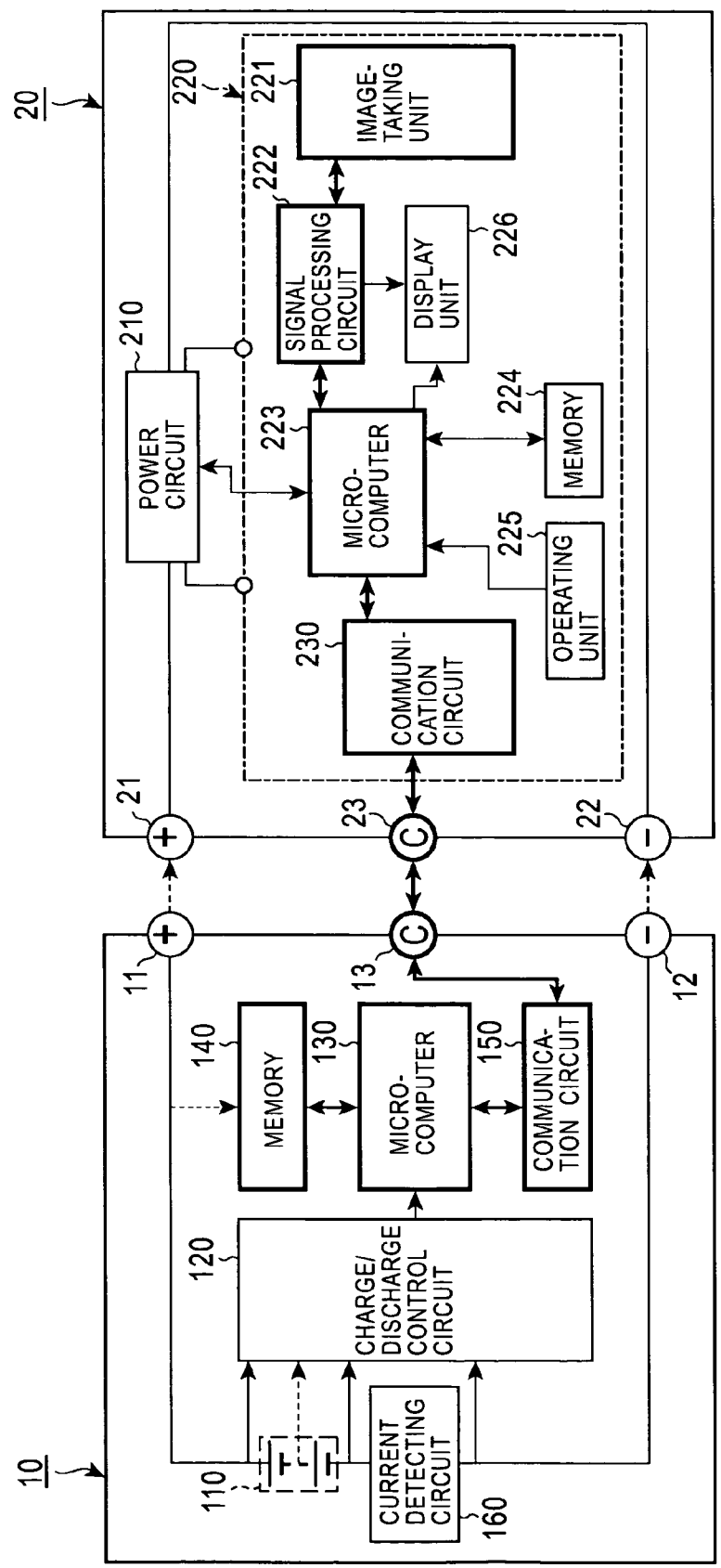
FIG. 14 is an explanatory diagram illustrating the data communication path between the electronic device (electronic device) shown in FIG. 13 and the battery pack.

Here, the actions of writing (recording) in the memory 140 of the battery pack 10 the image data taken by the image-taking device 20 which is the electronic device, will be described. The blocks and lines which are drawn heavier than the others in FIG. 14 indicate the data communication path for this case.

In a case of recording the image data taken by the image-taking device 20 in the memory 140 of the battery pack 10, first, data communication is started between the communication circuit 230 of the image-taking device 20 and the communication circuit 150 of the battery pack 10 (ST200). The micro-computer 223 of the image-taking device 20 then discriminates whether the battery pack 10 is in the "data recording mode" or not (ST201).

In the event that the battery pack 10 is in the "data recording mode", subsequently, the micro-computer 223 of the image-taking device 20 sends a signal to the battery pack 10 requesting the mode information set for the memory 140. Upon receiving the mode information send request signal sent form the image-taking device 20, the micro-computer 130 of the battery pack 10 sends the mode information set in the memory 140 to the image-taking device 20 (ST201→ST205).

On the other hand, in the event that the battery pack 10 is not in the "data recording mode", the micro-computer 223 of the image-taking device 20 sends a signal to the battery pack 10 requesting the battery type information. Upon receiving the send request signal for the battery type information sent from the image-taking device 20, the micro-computer 130 of the battery pack 10 reads out the battery type information set in a predetermined region of the memory 140, and sends this to the image-taking device 20 (ST201→ST202).

Upon receiving the battery type information of the battery pack 10, the micro-computer 223 of the image-taking device 20 discriminates whether or not the battery pack 10 is "data-recording compatible" (ST202). In the event that the battery pack 10 is "data-recording compatible", the battery pack 10 is in the "data recording mode", so the image-taking device 20 displays the icon 226a indicating that the battery type is "data-recording compatible" on the display unit 226, as shown in FIG. 12B, for example (ST202→ST203→ST204).

The micro-computer 223 of the image-taking device 20 then sends a signal to the battery pack 10 requesting the mode information set for the memory 140. Upon receiving the request signal for the mode information sent from the image-taking device 20, the micro-computer 130 of the battery pack 10 sends the mode information set for the memory 140 to the image-taking device 20 (ST204→ST205).

Upon receiving the mode information sent from the battery pack 10 in this way, the micro-computer 223 of the image taking device 20 detects the write mode set for the memory 140 of the battery pack 10, based on the received mode information (ST205).

Upon detecting that the memory 140 of the battery pack 10 is in the "write enable mode", the micro-computer 223 of the image-taking device 20 sends a signal to the battery pack 10 requesting operating permission information (ST205→ST206).

The micro-computer 130 of the battery pack 10 receives the operating permission send request signal sent from the image-taking device 20, and accordingly reads out the operating permission information set in a predetermined region of the memory 140 and sends this to the image-taking device 20. Upon receiving the operating permission information sent from the battery pack 10, the micro-computer 223 of the image-taking device 20 discriminates whether or not operations for writing to the memory 140 are permitted, based on the operating permission information (ST207). In the event that writing of data to the memory 140 is permitted, the micro-computer 223 of the image-taking device 20 enters a state for detecting a data (image data) recording start signal (ST207→ST208).

Upon the micro-computer 223 of the image-taking device 20 detecting the recording start signal, the data (image) data taken by the image-taking unit 221 and processed at the signal processing circuit 222 is sent to the battery pack 10 by the communication circuit 230. At the battery pack 10, the data (image data) received from the image-taking device 20 with the communication circuit 150 is recorded in the recording area of the memory 140 under control of the micro-computer 130 (ST208→ST209).

On the other hand, upon detecting that the memory 140 of the battery pack 10 is in the "write disable mode" based on the mode information sent from the battery pack 10, the micro-computer 223 of the image-taking device 20 makes a display on the display unit 226 to the effect of "write disabled", as shown in FIG. 12A (ST205→ST210, ST211).

Further, in the same way, in the event that writing of data to the memory 140 is not permitted according to the operating permission information sent from the battery pack 10, a display is made on the display unit 226 to the effect of "write disabled", as shown in FIG. 12A (ST207→ST210, ST211).

The micro-computer 223 of the image-taking device 20 then detects whether or not another recording medium is set in the device, following the display of "write disabled" on the display unit 226 (ST211→ST212). In the event that another recording medium to which recording can be performed is set in the device, the micro-computer 223 of the image-taking device 20 detects a recording start signal in the recording start signal detecting state with regard to this recording medium, the micro-computer 223 of the image-taking device 20 effects image-taking of the image-taking unit 221 and recording of the data (image) data processed at the signal processing circuit 222 to the recording medium (ST212→ST213, ST214).

In the event that there is no other recording medium to which recording can be performed within the device, the micro-computer 223 of the image-taking device 20 displays a warning "recording not available" on the display unit 226 (ST212→ST215).

The micro-computer 223 of the image-taking device 20 also detects whether or not another recording medium is set in the device, in the event that the battery pack 10 is not "data recording compatible" as well (ST202→ST212).

In the event that there is no other recording medium to which recording can be performed within the device, the micro-computer 223 of the image-taking device 20 displays on the display unit 226 (EVF or liquid crystal display) a warning "recording not available" (ST212→215).

Figure 15:
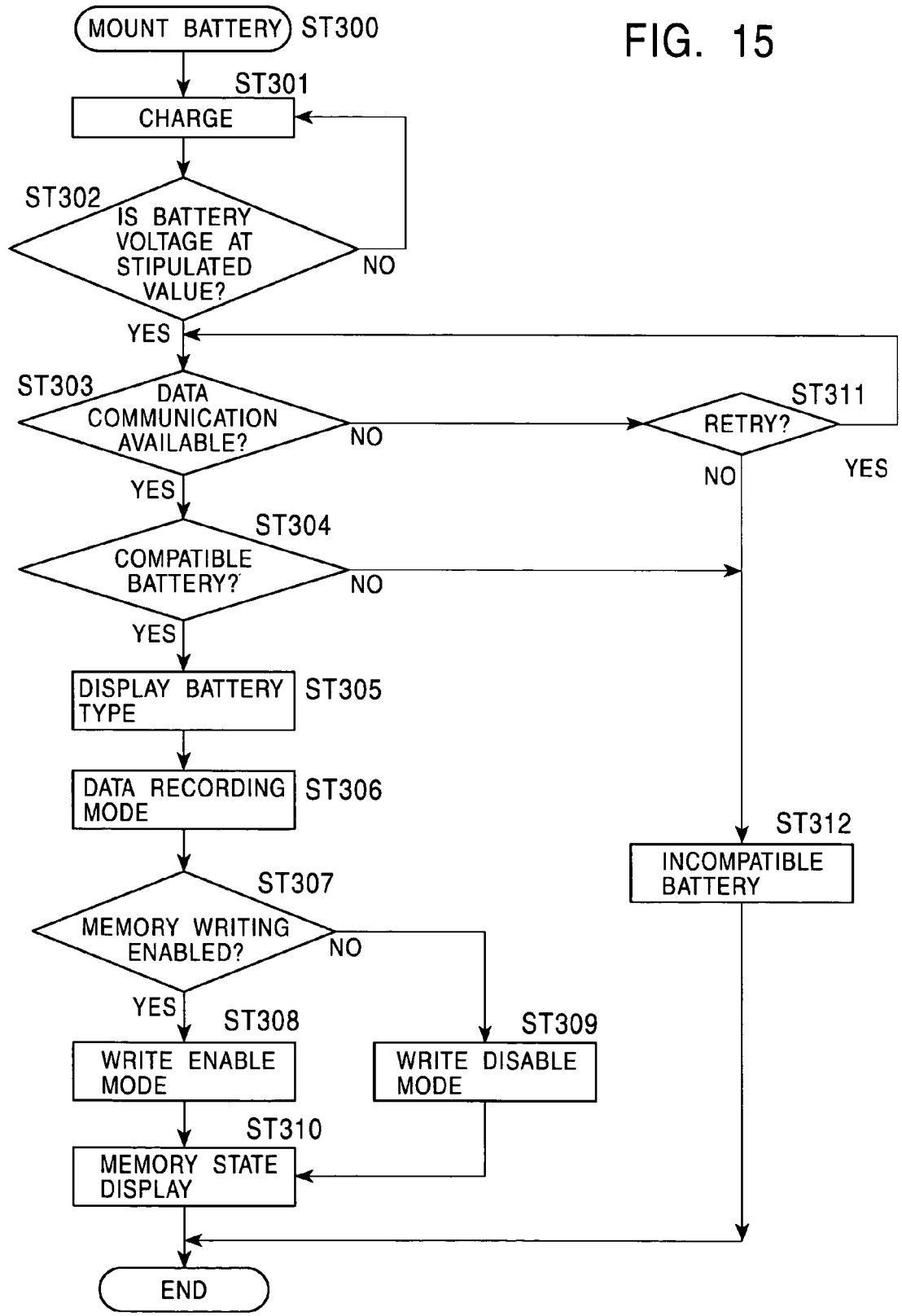
FIG. 15 is a flowchart illustrating the flow of operations occurring upon the battery pack being mounted to the charger, with the configuration shown in FIG. 5.
Figure 16:
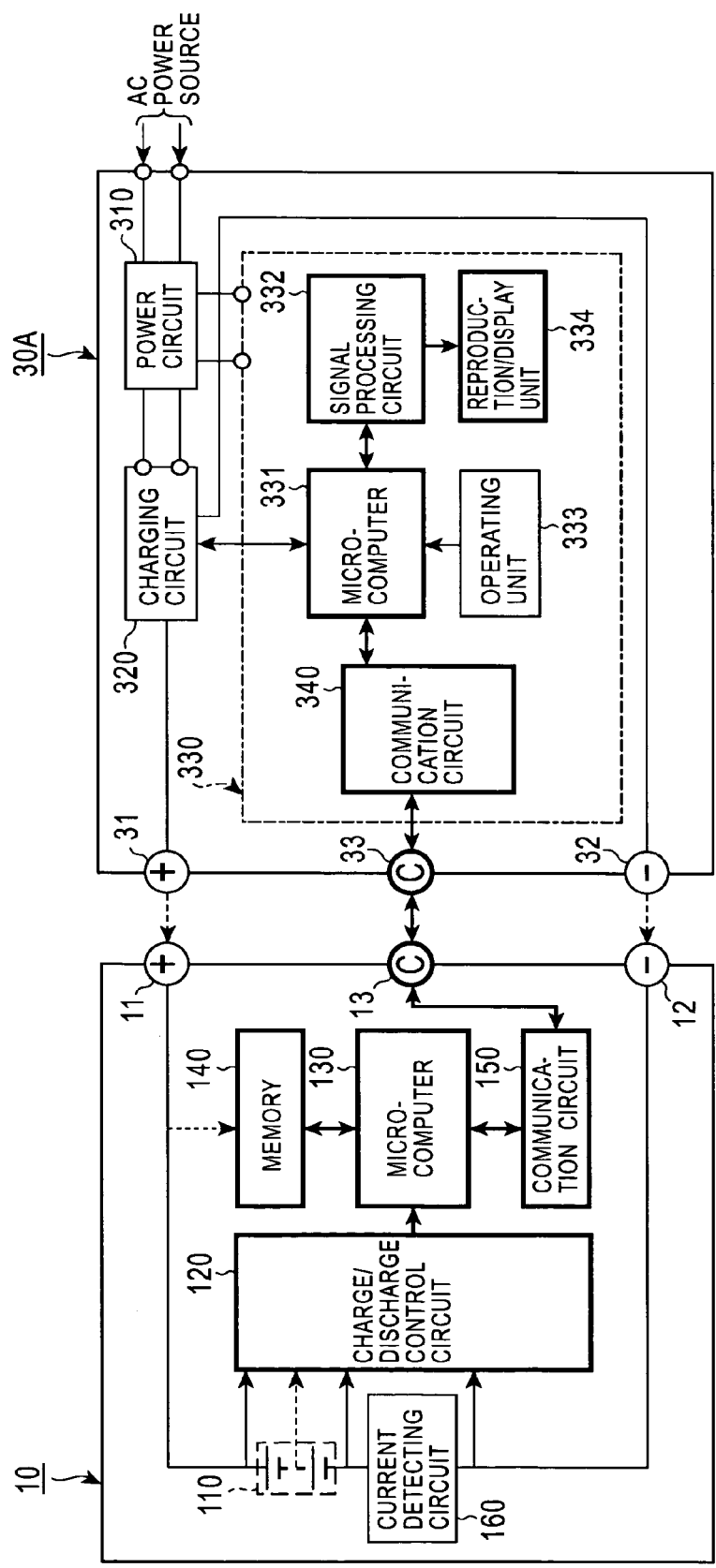
FIG. 16 is an explanatory diagram illustrating the data communication path between the charger and the battery pack in FIG. 5.

Next, the actions for detecting the type of the battery pack, the memory setting state of the memory built in, and the like, upon the battery pack 10 being set in the charger 30, will be described with reference to the flowchart shown in FIG. 15. The blocks and lines which are drawn heavier than the others in FIG. 16 indicate the data communication path for this case. The description will be made by way of example of the charger 30A shown in FIGS. 4 and 5.

Upon setting the battery pack 10 to the charger 30A, the positive terminal 11, negative terminal 12, and communication terminal 13 of the battery pack 10 are connected with the positive terminal 31, negative terminal 32, and communication terminal 33 of the charger 30A (ST300). Upon the battery being set, the charger 30A starts charging the battery cell 110 of the battery pack 10 connected via the positive terminal 31 and the negative terminal 32, with the charging circuit 320 (ST301).

The micro-computer 331 of the charger 30A detects, via the charging circuit 320, whether or not the voltage of the battery cell 110 of the battery pack 10 is a stipulated value or higher (ST302). In the event that the voltage of the battery cell 110 is below the stipulated value, charging is continued until the voltage reaches the stipulated value (ST302→ST301→ST302 and on).

In the event that the voltage of the battery cell 110 is the stipulated value or higher, the control circuit 340 is controlled so as to discriminate whether or not communication of data can be made with the communication circuit 150 of the battery pack 10 (ST302→ST303).

In the event that discrimination is made that communication of data cannot be made, the micro-computer 331 of the charger 30A retries a predetermined number of times to reconfirm whether or not communication of data can be made (ST303→ST311→ST303→ST311 and on). In the event that communication of data cannot be made with the communication circuit 150 of the battery pack 10 even after the predetermined number of retries, only the charging operations are performed for the battery pack 10 (ST311→ST312→end).

On the other hand, in the event that the micro-computer 331 of the charger 30A discriminates that communication of data can be made with the communication circuit 150 of the battery pack 10, the micro-computer 130 of the battery pack 10 reads out the battery type information set in the memory 140, and sends the battery type information that has been read out to the charger 30A.

Also, along with sending the battery type information, the micro-computer 130 of the battery pack 10 sends battery cell information collected by the charge/discharge control circuit 120 to the charger 30A. The battery cell information is sent via the communication terminal 13, along with the battery type information.

Upon receiving the battery type information and battery cell information sent via the communication terminal 33, the micro-computer 331 of the charger 30A discriminates whether or not the battery pack is "data recording compatible" from this battery type information (ST303→ST304). In the event that the battery type is "data recording compatible", the micro-computer 331 of the charger 30A makes an icon or text display on the reproducing/display unit 334 indicating that the battery pack 10 is a "data recording compatible" type as shown in FIG. 17, and displays the battery charging state, charging end time, and other such information, based on the battery cell information (ST305).

Once the battery pack 10 sends the battery type information and battery cell information to the charger 30A, the battery pack 10 enters a "data operating mode" wherein data operations such as reading, writing, rewriting, erasing (deleting) of data with regard to the memory 140 is enabled, and the mode information set in the memory 140 is sent to the charger 30A (ST306). Upon receiving this mode information sent from the battery pack 10, the micro-computer 331 of the charger 30A detects the write mode set for the memory 140 of the battery pack 10, based on this mode information (ST307).

Upon detecting that the memory 140 of the battery pack 10 is set to "write enable", the micro-computer 331 of the charger 30A then sends a signal requesting storage capacity information (available capacity or used capacity) of the memory 140 of the battery pack 10 (ST307→ST308). The micro-computer 130 of the battery pack 10 which has received the storage capacity information sending request signal sent form the charger 30A generates the storage capacity information (available capacity or used capacity) of the memory 140, and sends this to the charger 30A.

Figure 17:
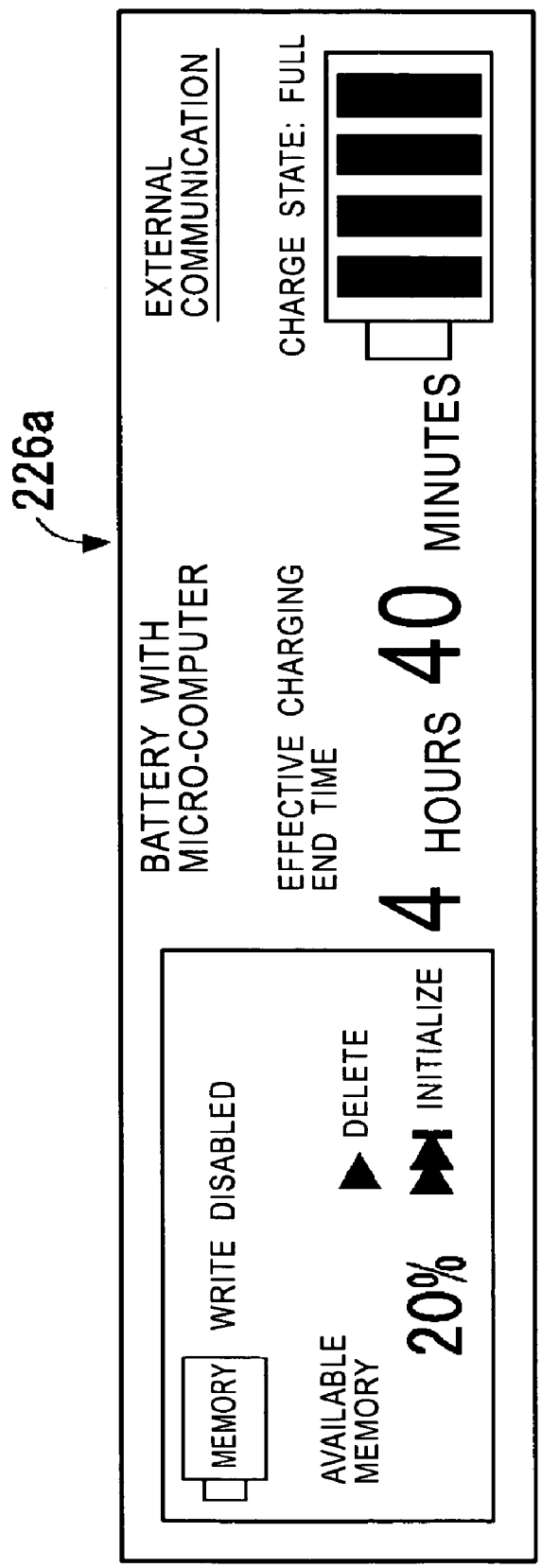
FIG. 17 is an explanatory diagram illustrating an example of the battery information display unit of the charger shown in FIG. 15.

The micro-computer 331 of the charger 30A which has received the storage capacity information (available capacity or used capacity) of the memory 140 sent form the battery pack 10 displays the received storage capacity information (available capacity or used capacity and like information) on the reproduction/display unit 334 as shown in FIG. 17 (ST308→ST310).

On the other hand, in the event that the micro-computer 331 of the charger 30A detects that the memory 140 of the battery pack 10 is set to the "write disable mode", the micro-computer 331 sends a signal requesting the storage capacity information (available capacity or used capacity) of the memory 140 of the battery pack 10 (ST307→ST309).

The micro-computer 130 of the battery pack 10 receives the storage capacity information send request signal sent from the charger 30A, and generates and sends the storage capacity information (available capacity or used capacity) of the memory 140 to the charger 30A. Upon receiving the storage capacity information (available capacity or used capacity) of the memory 140 sent from the battery pack 10, the micro-computer 331 of the charger 30A displays text of "write disabled" as shown in FIG. 17 for example, and also displays information such as the received storage capacity information (available capacity or used capacity) and "write disabled" on the reproduction/display unit 334 (ST309→ST310).

Figure 18:
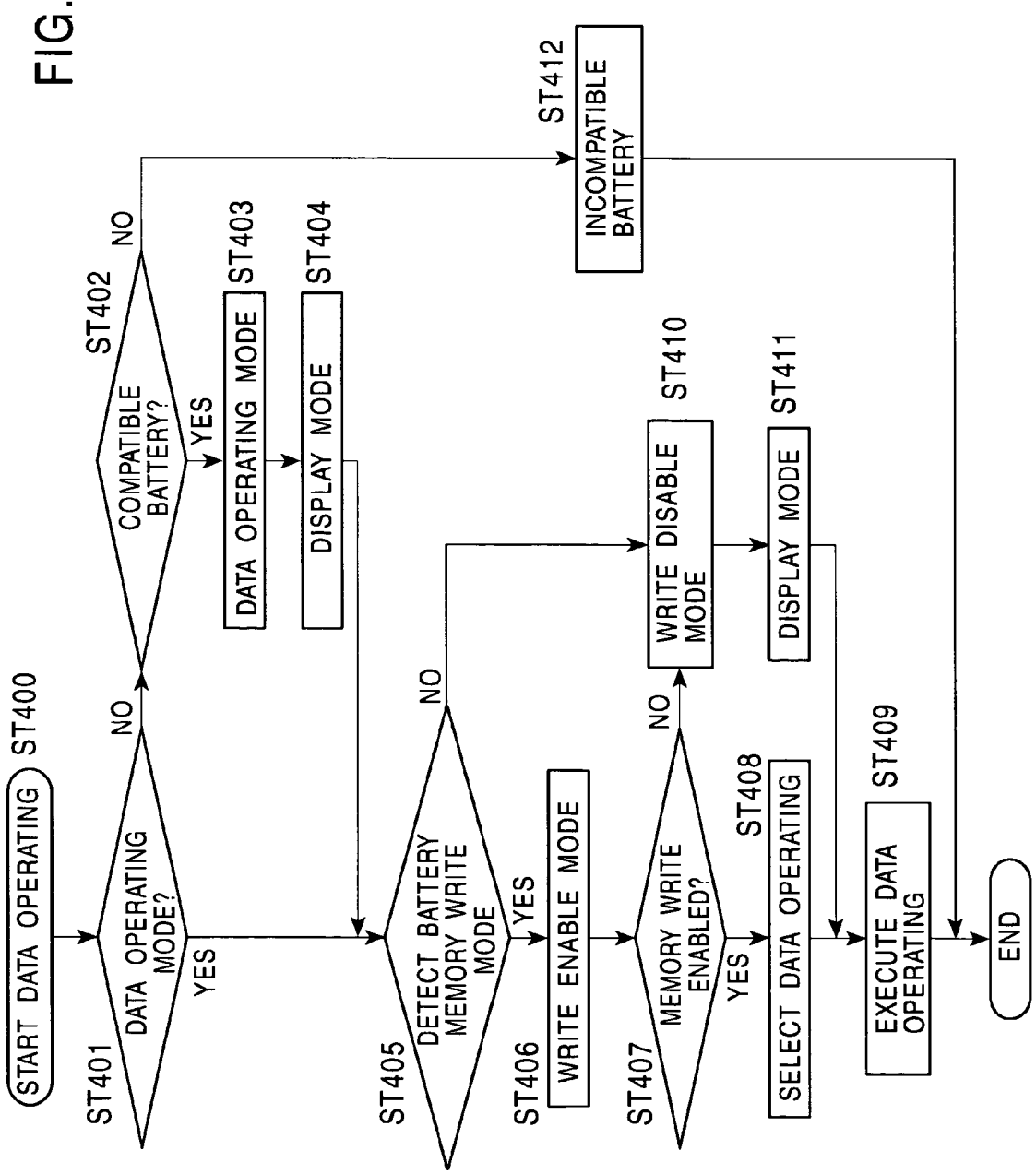
FIG. 18 is a flowchart illustrating the flow of operations occurring at the time of the data (image data) recorded in the battery pack being reproduced by operating the charger, with the configuration shown in FIG. 5.
Figure 19:
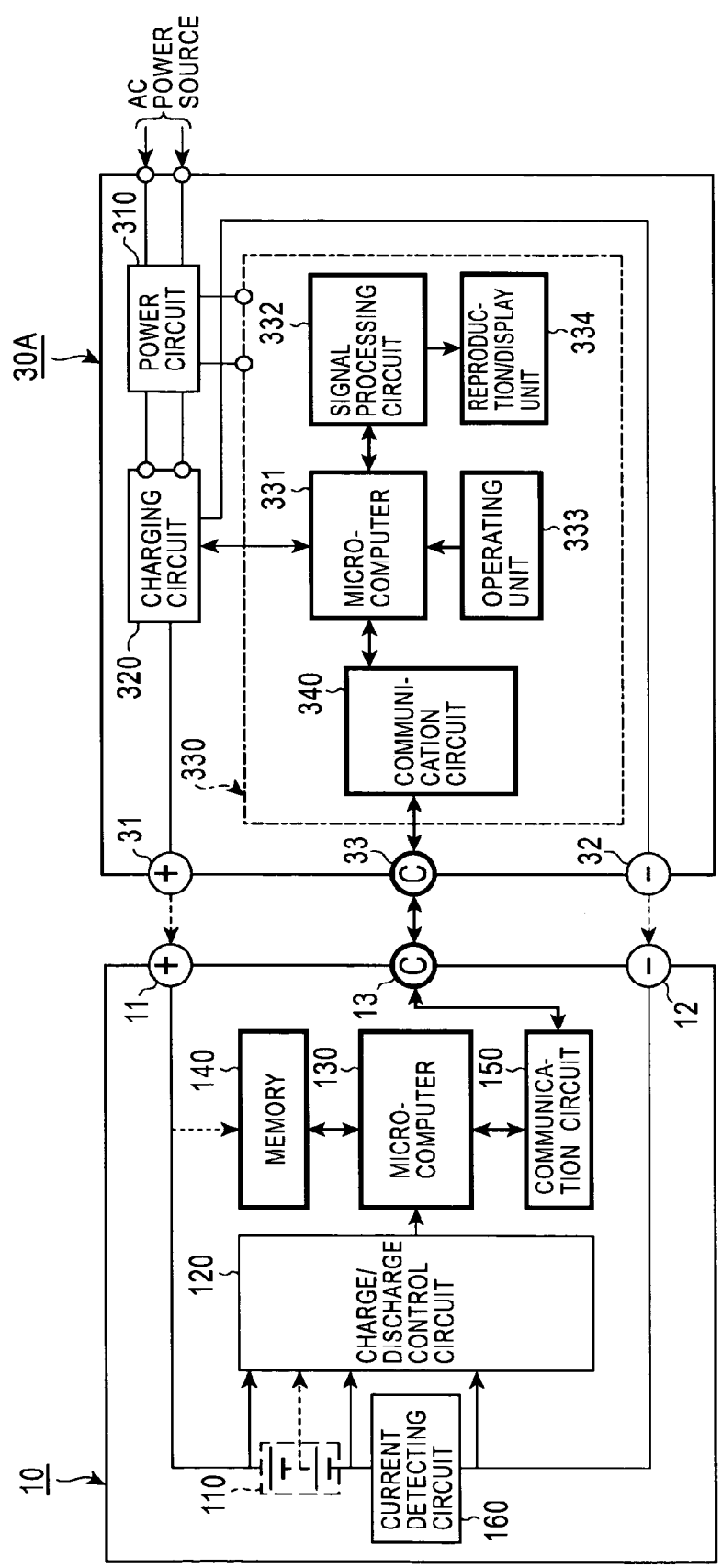
FIG. 19 is an explanatory diagram illustrating the data communication path between the charger and the battery pack in FIG. 18.

Next, the actions at the time of performing data operations (such as reading, writing, rewriting, erasing (deleting) of data) with regard to the memory 140 of the battery pack 10 set in the charger, will be described with reference to the flowchart shown in FIG. 18. The blocks and lines which are drawn heavier than the others in FIG. 19 indicate the data communication path for this case. This description will be made by way of example of the charger 30A shown in FIGS. 4 and 5, as with the preceding description.

Once data operation (such as reading, writing, rewriting, erasing (deleting) of data) is started with regard to the memory 140 of the battery pack 10, first, the micro-computer 331 of the charger 30A performs data communication with the communication circuit 150 of the battery pack 10 with the communication circuit 340, so as to discriminate whether or not the battery pack 10 is in the "data recording mode" (ST400, ST401).

In the event that the battery pack 10 is in the "data record mode", the micro-computer 331 of the charger 30A subsequently sends a signal to the battery pack 10 for requesting the mode information set in the memory 140. Upon receiving the request signal for the mode information sent from the charger 30A, the micro-computer 130 of the battery pack 10 sends the mode information set on the memory 140 to the image-taking device 20 (ST401→ST405).

On the other hand, the event that the battery pack 10 is not in the "data record mode", the micro-computer 331 of the charger 30A sends a signal requesting the battery type information to the battery pack 10. Upon receiving the battery type information send request signal from the charger 30A, the micro-computer 130 of the battery pack 10 reads out the battery type information set in a predetermined storage region of the memory 140 and sends this to the charger 30A (ST401→ST402).

The micro-computer 331 of the charger 30A receives the battery type information of the battery pack 10, and discriminates whether or not the battery pack is "data recording compatible" (ST402). In the event that the battery pack is "data recording compatible", the battery pack 10 is in the "data recording mode", so the charger 30A displays an icon or the like indicating that the battery type is "data-recording compatible" on the reproduction/display unit 334, as shown in FIG. 17, for example (ST402→ST403, ST404).

The micro-computer 331 of the charger 30A then sends a signal to the battery pack 10 requesting the mode information set for the memory 140. Upon receiving the request signal for the mode information sent from the charger 30A, the micro-computer 130 of the battery pack 10 sends the mode information set on the memory 140 to the charger 30A based on the mode information send request signal (ST404→ST405).

Upon receiving the mode information sent from the battery pack 10 in this way, the micro-computer 331 of the charger 30A detects the write mode set on the memory 140 of the battery pack 10, based on the received mode information (ST405).

Upon detecting that the memory 140 of the battery pack 10 is in the "write enable mode", the micro-computer 331 of the charger 30A sends a signal to the battery pack 10 requesting operating permission information (ST405→ST406).

The micro-computer 130 of the battery pack 10 receives the operating permission send request signal sent from the charger 30A, and accordingly reads out the operating permission information set in a predetermined region of the memory 140 and sends this to the charger 30A (ST406). Upon receiving the operating permission information sent from the battery pack 10, the micro-computer 331 of the charger 30A discriminates whether or not data operations (writing data, rewriting, erasing (deleting) etc.) regarding the memory 140 are permitted, based on the operating permission information (ST407). In the event that data operations (writing data, rewriting, erasing (deleting) etc.) regarding the memory 140 are permitted, desired data operations regarding the memory 140 of the battery pack 10 (reading, writing, rewriting, erasing (deleting), copying, etc.) are selected with a memory operating unit 333a (ST408).

The micro-computer 331 of the charger 30A sends operation control signals corresponding to the data operations (reading, writing, rewriting, erasing (deleting), copying, etc.) selected with a memory operating unit 333a to the battery pack 10 with the communication circuit 340. Upon receiving the operation control signal from the charger 30A, the micro-computer 130 of the battery pack 10 performs actions such as reading out the data stored in the storage region of the memory 140 and sending to the charger 30A, writing the data sent from the charger 30A to the data storage region, rewriting or erasing (deleting) the data stored in the storage region, and copying (ST409).

On the other hand, upon detecting that the memory 140 of the battery pack 10 is in the "write disable mode" based on the mode information sent from the battery pack 10, the micro-computer 331 of the charger 30A displays on the reproduction/display unit 334a that the battery pack is "write disabled" via the reproduction/display unit 334 as shown in FIG. 17 for example, and makes settings such that the only operations which can be made for the data in the memory 140 are reading operations (ST405→ST410→ST411).

Also, in the same way, in the event that operating data regarding the memory 140 is not permitted by the operation permission information sent from the battery pack 10, i.e., in the event that only data reading can be performed, the micro-computer 331 of the charger 30A displays on the reproduction/display unit 334a that the battery pack is "write disabled" (or "operation forbidden") via the reproduction/display unit 334 as shown in FIG. 17 for example, and makes settings such that the only operations which can be made for the data in the memory 140 are reading operations (ST407→ST410→ST411).

The charger 30A can execute only data reading operations from the memory 140 of the battery pack 10 with the memory operating unit 333a, and upon performing predetermined reading operations, the micro-computer 331 sends operation control signals corresponding to the reading operation to the battery pack 10 with the communication circuit 340 (ST411→ST409).

The micro-computer 130 of the battery pack 10 receives operation control signals (read operations) sent from the charger 30A, and reads out the data stored in the storage region of the memory 140 and sends this to the charger 30A. Upon receiving the data sent from the battery pack 10, the micro-computer 331 of the charger 30A subjects the data to predetermined signal processing with the signal processing unit 332 or the like, and reproduces or displays the data subjected to signal processing, with the reproduction/display unit 334.

Next, an example of data operations performed based on the above-described flowchart shown in FIG. 18 will be described in detail. Let us say that image data (image data taken with the image-taking device 20) is recorded in the memory 140 of the battery pack 10, and description will be made regarding how to view this image data.

First, the battery pack 10 is set in the charger 30A, and the memory operating unit 333a of the charger 30A is operated. For example, pressing an "image reproduction key" causes the micro-computer 331 to send an operation control signal corresponding to the "image reproduction key" to the battery pack 10 by the communication circuit 340. Upon receiving this operation control signal sent from the charger 30A with the communication circuit 150, the battery pack 10 generates image selection data (an image selection menu) for selecting desired image data from the image data recorded in the memory 140, based on the operation control signal which the micro-computer 130 has received, and sends this to the charger 30A.

The charger 30A receives the image selection data sent from the battery pack 10 with the communication circuit 340, and displays the received image selection data (image selection menu) on the data reproduction/display unit 334b via the reproduction/display unit 334, under the control of the micro-computer 331. The user operates the memory operating unit 333a to specify image selection data of an image which the user wishes to view, from the image selection data (image selection menu) displayed on the data reproduction/display unit 334b, and the micro-computer 331 of the charger 30A sends the specified image selection data to the battery pack 10 via the communication circuit 340. Upon receiving the image selection data sent from the charger 30A with the communication circuit 150, the micro-computer 130 of the battery pack 10 reads out the predetermined image data from the image data recorded in the memory 140 based on the received image selection data, and sends the image data that has been read out to the charger 30A.

The micro-computer 331 of the charger 30A receives the image data sent from the battery pack 10 with the communication circuit 340, and sends the received image data to the signal processing circuit 332, where the image data is subjected to predetermined signal processing at and then sent to the reproduction/display unit 334. At the reproduction/display unit 334, the image data that has been subjected to the signal processing is reproduced, and displayed on the data reproduction/display unit 334b.

Figure 20:
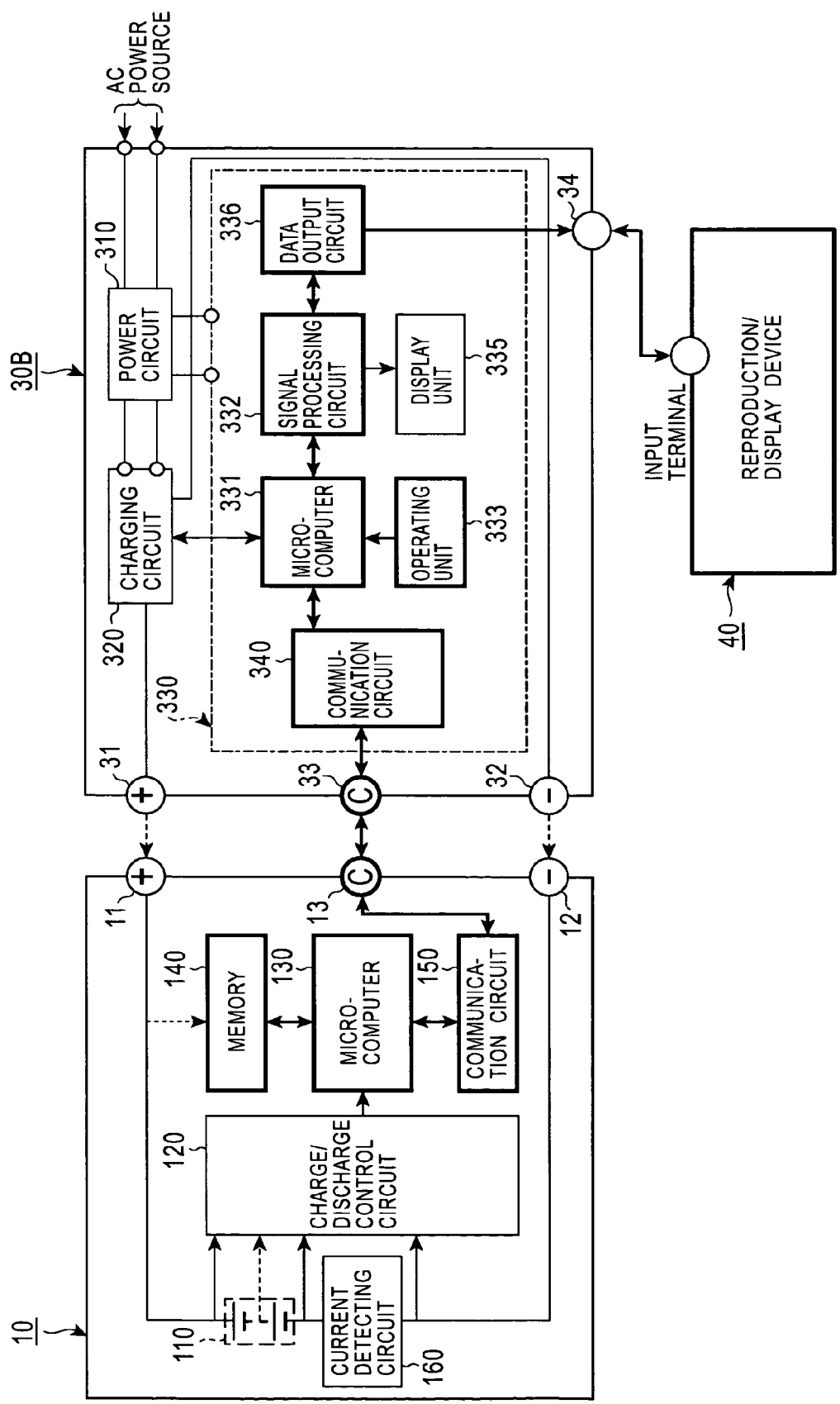
FIG. 20 is a an explanatory diagram describing the data communication path at the time of the data (image data) recorded in the battery pack being operated by the charger and reproduced by operating a reproducing/display device, with the configuration shown in FIG. 7.

In the same way, a case of viewing the image data (image data taken with the image-taking device 20) recorded in the memory 140 of the battery pack 10 with a charger 30B having the output terminal 34 illustrated in FIGS. 6 and 7 will be described. Note that with the case of the charger 30B, the blocks and lines which are drawn heavier than the others in FIG. 20 indicate the data communication path.

With the case of the charger 30B, the process up till signal processing of the image data sent from the battery pack 10 with the signal processing circuit 332 is the same as that with the charger 30A. Subsequently, the image data subjected to signal processing by the signal processing circuit 332 is sent to the data output circuit 336, converted into a predetermined data format by the data output circuit 336, sent to a reproduction/display device 40 (e.g., a television receiver or the like) connected to the output terminal 34, where the image data is reproduced or displayed at the reproduction /display device 40.

Figure 21:
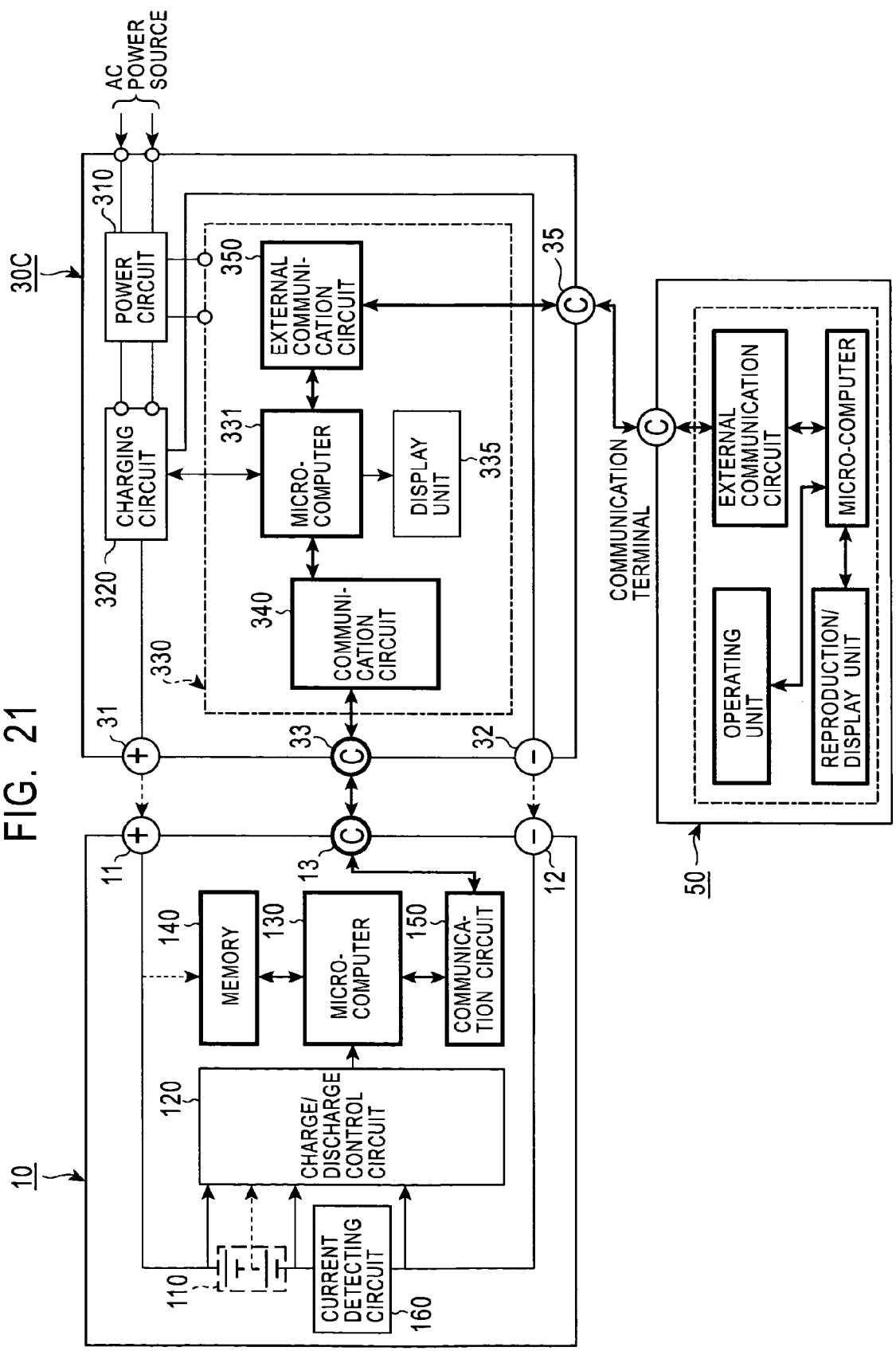
FIG. 21 is an explanatory diagram describing the data communication path at the time of the data (image data) recorded in the battery pack being reproduced by operating an information processing device connected via the charger, with the configuration shown in FIG. 9.

Further, a case will be described of viewing the image data (image data taken with the image-taking device 20) recorded in the memory 140 of the battery pack 10 with a charger 30C having the external communication terminal 35 illustrated in FIGS. 8 and 9. In the case of the charger 30C, connection is made via the external communication terminal 35 to an information processing device 50 (PC or the like) to which software for operating the data in the memory 140 of the battery pack 10 has been installed. The blocks and lines which are drawn heavier than the others in FIG. 21 indicate the data communication path in this case.

First, in the event of performing data operations with regard to the memory 140 of the battery pack 10, software or the like for performing such operations is activated, and the operating unit of the information processing device 50 (PC or the like) is operated to select "image reproduction". A microprocessor in the information processing device 50 (PC or the like) sends to the charger 30C operation control signals corresponding to the selected "image reproduction", by the external communication circuit 350.

The charger 30C receives the operation control signals sent form the information processing device 50 (PC or the like) with the external communication circuit 350, and converts the operation control signals into predetermined data format which is sent to the battery pack 10 with the communication circuit 340, under control of the micro-computer 331.

Upon receiving this operation control signal sent from the information processing device 50 (PC or the like) via the charger 30C with the communication circuit 150, the micro-computer 130 of the battery pack 10 generates image selection data (image selection menu) for selecting desired image data from the image data recorded in the memory 140, based on the operation control signals, and sends the image selection data (image selection menu) to the charger 30C.

The micro-computer 331 of the charger 30C receives the image selection data sent from the battery pack 10 with the communication circuit 340, converts the received image selection data (image selection menu) into a predetermined data format, and sends the converted image selection data (image selection menu) to the information processing device 50 (PC or the like) with the external communication circuit 350. The micro-computer of the information processing device 50 (PC or the like) receives the image selection data sent from the charger 30C with the external communication circuit, and displays the received image selection data (image selection menu) on a monitor screen or the like via a reproduction/display unit.

The user operates the operating unit of the information processing device 50 (PC or the like) to specify image selection data of an image which the user wishes to view, from the image selection data (image selection menu) displayed on the monitor screen or the like, the specified image selection data is sent to the charger 30C via the external communication circuit. The micro-computer 331 of the charger 30C receives the image selection data sent form the information processing device 50 (PC or the like) with the external communication circuit 350, converts the received image selection data (image selection menu) into a predetermined data format, and sends this to the battery pack 10 with the communication circuit 340.

Upon receiving the image selection data sent from the charger 30C with the communication circuit 150, the micro-computer 130 of the battery pack 10 reads out the predetermined image data from the image data recorded in the memory based on the received image selection data, and sends the image data that has been read out to the charger 30C with the communication circuit.

The micro-computer 331 of the charger 30C receives the image data sent from the battery pack 10 with the communication circuit 340, converts the received image data into a predetermined data format, and sends the converted image data to the information processing device 50 (PC or the like) with the external communication circuit 350. The information processing device 50 (PC or the like) subjects the received image data to signal processing, and sends the data subjected to signal processing to a reproduction/display unit, under control of the micro-computer. The image data that has been reproduced in the reproduction/display unit is reproduced or displayed on the monitor screen or the like.

Note that the above-described data is by no means restricted to image data, and may be audio data, software, programs or other types of data.

What is claimed is:

1. A battery pack for providing power and for storing user data, comprising:
    a connection terminal connecting to electronic equipment to supply electric power thereto, and connecting to a charger;
    a communication terminal for communicating with said electronic equipment and said charger;
    storage means for storing said user data processed by said electronic equipment, said storage means being large enough to store image data;
    data control means for controlling reading processing, writing processing, deleting processing, and duplication processing of said user data with regard to said data storage means, based on control signals from said electronic equipment or said charger; and
    data communication means for transmitting and receiving said user data via said communication terminal under control of said data control means;
    wherein said storage means, said data control means, and said data communication means are built within said battery pack,
    wherein when communicating with said electronic equipment and said charger, the battery pack communicates information regarding data recording compatibility, mode information, operating permission information,
    wherein the information regarding data recording compatibility comprises information indicating whether the battery pack is data recording compatible,
    wherein the mode information indicates whether the data recording compatibility is enabled, and storage capacity information.

2. The battery pack according to claim 1, wherein said data storage means storing information relating to electric power capacity of the battery pack and data processed by said electronic equipment.

3. The battery pack according to claim 1, wherein said data communication means transmit information relating to the electric power capacity of the battery pack via said communication terminal.

4. A charger for charging a battery pack with data storage means for storing user data processed by electronic equipment, said charger comprising:
    a connection terminal for charging said battery pack;
    a communication terminal for communicating with said battery pack;
    data communication means for transmitting and receiving said user data to and from said battery pack via said communication terminal;
    the user data including image data;
    operating means for transmitting control signals for instructing reading processing, writing processing, deleting processing, and duplication processing of said user data to said data storage means of said battery pack, via said data communication means; and
    data reproducing means for reproducing said user data obtained via said data communication means,
    wherein when communicating with said electronic equipment and said charger, the battery pack communicates information regarding data recording compatibility, mode information, operating permission information,
    wherein the information regarding data recording compatibility comprises information indicating whether the battery pack is data recording compatible,
    wherein the mode information indicates whether the data recording compatibility is enabled, and storage capacity information.

5. A charger for charging a battery pack with data storage means for storing user data processed by electronic equipment, said charger comprising:
    a connection terminal for charging said battery pack;
    a communication terminal for communicating with said battery pack;
    data communication means for transmitting and receiving said user data to and from said battery pack via said communication terminal;
    user data including image data;
    operating means for transmitting control signals for instructing reading processing, writing processing, deleting processing, and duplication processing of said user data to said data storage means of said battery pack, via said data communication means; and
    data output means for outputting said user data obtained via said data communication means,
    wherein when communicating with said electronic equipment and said charger, the battery pack communicates information regarding data recording compatibility, mode information, operating permission information,
    wherein the information regarding data recording compatibility comprises information indicating whether the battery pack is data recording compatible,
    wherein the mode information indicates whether the data recording compatibility is enabled, and storage capacity information.

6. A charger for charging a battery pack with data storage means for storing user data processed by electronic equipment, said charger comprising:
    a connection terminal for charging said battery pack;

a first communication terminal for communicating with said battery pack;

a second communication terminal for communicating with an information processing device adapted to control reading processing, writing processing, deleting processing, and duplication processing of said user data with regard to said data storage means of said battery pack;

user data including image data;

first data communication means for transmitting and receiving said user data to and from said battery pack via said first communication terminal;

second data communication means for transmitting and receiving said user data via said second communication terminal; and data operating control means for controlling transmission and reception of said user data between said battery pack and said information processing device via said first and second communication means, wherein when communicating with said electronic equipment and said charger, the battery pack communicates information regarding data recording compatibility, mode information, operating permission information, wherein the information regarding data recording compatibility comprises information indicating whether the battery pack is data recording compatible, wherein the mode information indicates whether the data recording compatibility is enabled, and storage capacity information.

7. A method for providing power and for storing user data in a battery pack, the method comprising the steps of:

connecting the battery pack to electronic equipment to supply electric power;

communicating said user data with said electronic equipment and a charger;

storing said user data processed by said electronic equipment, said storing capable of storing image data; and controlling reading processing, writing processing, deleting processing, and duplication processing of said user data based on control signals from said electronic equipment and said charger, wherein when communicating with said electronic equipment and said charger, the battery pack communicates information regarding data recording compatibility, mode information, operating permission information, wherein the information regarding data recording compatibility comprises information indicating whether the battery pack is data recording compatible, wherein the mode information indicates whether the data recording compatibility is enabled, and storage capacity information.

* * * * *